(12) United States Patent
Weslosky et al.

(10) Patent No.: US 11,745,757 B2
(45) Date of Patent: Sep. 5, 2023

(54) ORCHESTRATOR FOR INTERCONNECTED AUTONOMOUS VEHICLE FLEET ECOSYSTEM

(71) Applicant: Nuro, Inc., Mountain View, CA (US)

(72) Inventors: Emily Anna Weslosky, San Francisco, CA (US); Yanqi Tyson Chen, San Francisco, CA (US); Andrew Joseph Beinstein, Mountain View, CA (US)

(73) Assignee: NURO, INC., Mountain View, CA (US)

( * ) Notice: Subject to any disclaimer, the term of this patent is extended or adjusted under 35 U.S.C. 154(b) by 381 days.

(21) Appl. No.: 17/065,195

(22) Filed: Oct. 7, 2020

(65) Prior Publication Data

US 2021/0114614 A1 Apr. 22, 2021

Related U.S. Application Data

(60) Provisional application No. 62/916,079, filed on Oct. 16, 2019.

(51) Int. Cl.
*B60W 60/00* (2020.01)
*G06Q 10/0833* (2023.01)
(Continued)

(52) U.S. Cl.
CPC ......... *B60W 60/001* (2020.02); *B60R 25/209* (2013.01); *G06F 11/0721* (2013.01);
(Continued)

(58) Field of Classification Search
CPC ............... B60W 60/001; B60R 25/209; G06F 11/0721; G06F 11/0793; G06Q 10/0833;
(Continued)

(56) References Cited

U.S. PATENT DOCUMENTS 9,465,388 B1 10/2016 Fairfield et al.
9,494,935 B2 11/2016 Okumura et al.
(Continued)

OTHER PUBLICATIONS

Oliver Cameron, "Introducing Voyage Telessist, Telessist combines the intelligence of a human driver with our self-driving A.I. to handle edge cases", Voyage, Jul. 2020, 15 pages.

*Primary Examiner* — Nadeem Odeh
(74) *Attorney, Agent, or Firm* — Edell, Shaprio & Finnan, LLC

(57) ABSTRACT

An orchestrator for a fleet management system is disclosed herein. The orchestrator is configured to monitor completion of an assigned job by an autonomous vehicle in a fleet of autonomous vehicles. For example, the autonomous vehicle may have an assigned job of delivering cargo from one location to another location. The orchestrator can identify a plurality of tasks to be completed by a plurality of subsystems of the fleet management system in order to enable completion of the assigned job by the autonomous vehicle. For example, the subsystems may include a troubleshooting subsystem, a remote operations subsystem, a fleet operations subsystem, a fleet coordinator, and/or an interface. The orchestrator can coordinate completion of the tasks by the plurality of subsystems.

22 Claims, 14 Drawing Sheets

(51) Int. Cl.
*G08G 1/01* (2006.01)
*G08G 1/00* (2006.01)
*B60R 25/20* (2013.01)
*G06F 11/07* (2006.01)
*G07C 5/00* (2006.01)
*G07C 5/08* (2006.01)
*G06Q 10/0631* (2023.01)
*G06Q 50/28* (2012.01)

(52) U.S. Cl.
CPC ..... *G06F 11/0793* (2013.01); *G06Q 10/0833* (2013.01); *G07C 5/008* (2013.01); *G07C 5/0825* (2013.01); *G07C 5/0858* (2013.01); *G08G 1/0145* (2013.01); *G08G 1/20* (2013.01); *G06Q 10/06315* (2013.01); *G06Q 50/28* (2013.01)

(58) Field of Classification Search
CPC .. G06Q 10/06315; G06Q 50/28; G07C 5/008; G07C 5/0825; G07C 5/0858; G08G 1/0145; G08G 1/20; G08G 1/202
See application file for complete search history.

(56) References Cited

U.S. PATENT DOCUMENTS

| | | | |
|---|---|---|---|
| 9,720,410 B2 | 8/2017 | Fairfield et al. | |
| 10,514,692 B2 | 12/2019 | Liu et al. | |
| 2018/0154899 A1* | 6/2018 | Tiwari | B60W 10/20 |
| 2020/0238999 A1* | 7/2020 | Batts | G01B 5/207 |
| 2020/0317226 A1* | 10/2020 | Wang | H04L 43/10 |
| 2020/0377128 A1* | 12/2020 | Marczuk | G06Q 10/063 |
| 2021/0031799 A1* | 2/2021 | Tokuda | G01C 21/3461 |
| 2021/0276597 A1* | 9/2021 | Yu | G05D 1/0212 |

* cited by examiner

ORCHESTRATOR FOR INTERCONNECTED AUTONOMOUS VEHICLE FLEET ECOSYSTEM

CROSS REFERENCE TO RELATED APPLICATION

This application claims priority to U.S. Provisional Patent Application No. 62/916,079, titled "Interconnected Command Ecosystem for Autonomous Vehicles," filed Oct. 16, 2019, the entirety of which is incorporated herein by reference.

TECHNICAL FIELD

The disclosure relates generally to providing remote support for a fleet of autonomous vehicles.

BACKGROUND

The handling and delivery of goods and services using autonomous vehicles will improve society, e.g., by allowing people to engage in productive work while waiting for an autonomous vehicle to deliver goods rather than spending time procuring the goods. As the use of autonomous vehicles is growing, the ability to operate the autonomous vehicles efficiently and safely is becoming more important.

DESCRIPTION OF EXAMPLE EMBODIMENTS

Overview

Figure 1:
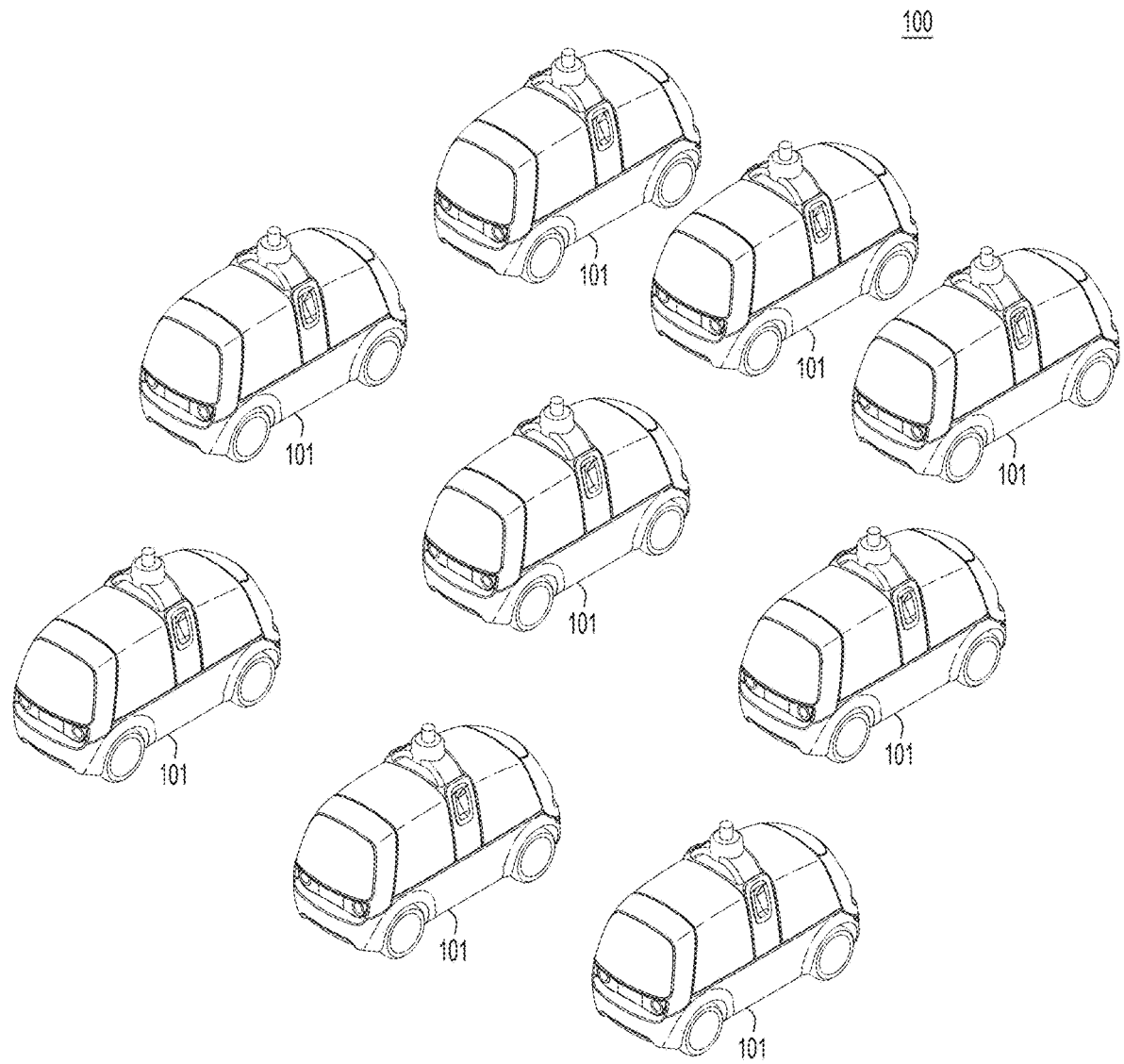
FIG. 1 is a diagram of an autonomous vehicle fleet, according to an example embodiment.

In one embodiment, an orchestrator for a fleet management system is provided. The orchestrator is configured to monitor completion of an assigned job by an autonomous vehicle in a fleet of autonomous vehicles. For example, the autonomous vehicle may have an assigned job of delivering cargo from one location to another location.

The orchestrator can identify a plurality of tasks to be completed by a plurality of subsystems of the fleet management system in order to enable completion of the assigned job by the autonomous vehicle. For example, the subsystems may include a troubleshooting subsystem, a remote operations subsystem, a fleet operations subsystem, a fleet coordinator, and/or an interface. The orchestrator can coordinate completion of the tasks by the plurality of subsystems.

Example Embodiments

As the use of autonomous vehicles becomes more widespread, the ability to address unforeseen issues with the autonomous vehicles is increasing in importance. For example, when an autonomous vehicle breaks down or otherwise can no longer operate safely, the ability to provide remote assistance to the autonomous vehicle may allow the autonomous vehicle to be efficiently repaired. As a result, downtime associated with the autonomous vehicle may be substantially minimized.

A fleet of autonomous vehicles may be part of an interconnected or remote command ecosystem that allows the fleet to be remotely commanded, e.g., when there is an unexpected situation, and may also allow the fleet to be substantially prepared for service remotely. In an example embodiment, an orchestrator of a fleet management system is configured to remotely coordinate autonomous vehicle fleet operations across the ecosystem. For example, the orchestrator may coordinate with various subsystems of the fleet management system and/or systems external to the fleet management system to enable remote troubleshooting, repair, recovery, and other operations for the fleet.

Example embodiments that may be used to implement the features and functionality of this disclosure will now be described with more particular reference to the accompanying figures. When used to describe a range of dimensions and/or other characteristics (e.g., time, distance, length, etc.) of an element, operations, conditions, etc. the phrase "between X and Y" represents a range that includes X and Y. Similarly, when used herein, the term "approximately" and terms of its family (such as "approximate", etc.) should be understood as indicating values very near to those which accompany the aforementioned term. That is to say, a deviation within reasonable limits from an exact value should be accepted because a skilled person in the art will understand that such a deviation from the values indicated is inevitable due to measurement inaccuracies, etc. The same applies to the terms "about" and "around" and "substantially". Similarly, when used herein, the term "comprises" and its derivations (such as "comprising", etc.) should not be understood in an excluding sense, that is, these terms should not be interpreted as excluding the possibility that what is described and defined may include further elements, steps, etc. Further, each example embodiment is described herein as illustrative and is not to be construed as a preferred or advantageous embodiment, but rather as one example or illustration of a possible embodiment.

Referring initially to FIG. 1, an autonomous vehicle fleet 100 will be described in accordance with an example embodiment. The autonomous vehicle fleet 100 includes a plurality of autonomous vehicles 101. Each autonomous vehicle 101 is a manned or unmanned mobile machine configured to transport people, cargo, or other items, whether on land or water, air, or another surface, such as a car, wagon, van, tricycle, truck, bus, trailer, train, tram, ship, boat, ferry, drove, hovercraft, aircraft, etc.

Each autonomous vehicle 101 may be fully or partially autonomous such that the vehicle can travel in a controlled manner for a period of time without human intervention. For example, a vehicle may be "fully autonomous" if it is configured to be driven without any assistance from a human operator, whether within the vehicle or remote from the vehicle, while a vehicle may be "semi-autonomous" if it uses some level of human interaction in controlling the operation of the vehicle, whether through remote control by, or remote assistance from, a human operator, or local control/assistance within the vehicle by a human operator. A vehicle may be "non-autonomous" if it is driven by a human operator located within the vehicle. A "fully autonomous vehicle" may have no human occupant or it may have one or more human occupants that are not involved with the operation of the vehicle; they may simply be passengers in the vehicle.

In an example embodiment, each autonomous vehicle 101 may be configured to switch from a fully autonomous mode to a semi-autonomous mode, and vice versa. Each autonomous vehicle 101 also may be configured to switch between a non-autonomous mode and one or both of the fully autonomous mode and the semi-autonomous mode.

The fleet 100 may be generally arranged to achieve a common or collective objective. For example, the autonomous vehicles 101 may be generally arranged to transport and/or deliver people, cargo, and/or other items. A fleet management system (not shown) can, among other things, coordinate dispatching of the autonomous vehicles 101 for purposes of transporting, delivering, and/or retrieving goods and/or services. The fleet 100 can operate in an unstructured open environment or a closed environment.

Figure 2:
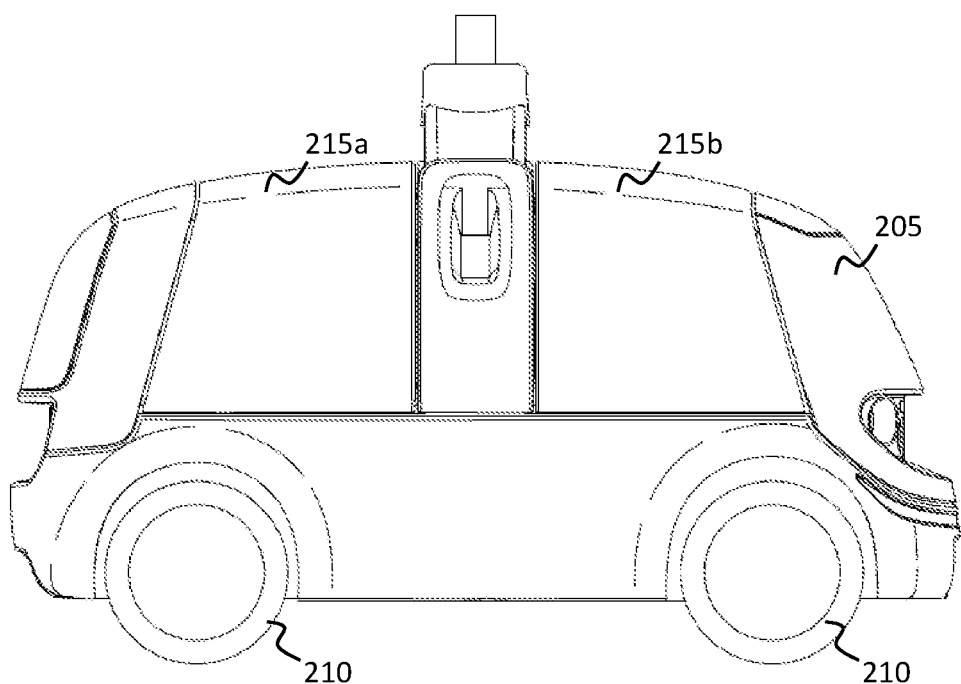
FIG. 2 is a diagram of a side of an autonomous vehicle, according to an example embodiment.

FIG. 2 is a diagram of a side of an autonomous vehicle 101, according to an example embodiment. The autonomous vehicle 101 includes a body 205 configured to be conveyed by wheels 210 and/or one or more other conveyance mechanisms. In an example embodiment, the autonomous vehicle 101 is relatively narrow (e.g., approximately two to approximately five feet wide), with a relatively low mass and low center of gravity for stability.

The autonomous vehicle 101 may be arranged to have a moderate working speed or velocity range of between approximately one and approximately forty-five miles per hour ("mph"), e.g., approximately twenty-five mph, to accommodate inner-city and residential driving speeds. In addition, the autonomous vehicle 101 may have a substantially maximum speed or velocity in a range of between approximately thirty and approximately ninety mph, which may accommodate, e.g., high speed, intrastate or interstate driving. As would be recognized by a person of ordinary skill in the art, the vehicle size, configuration, and speed/velocity ranges presented herein are illustrative and should not be construed as being limiting in any way.

The autonomous vehicle 101 includes multiple compartments (e.g., compartments 215a and 215b), which may be assignable to one or more entities, such as one or more customers, retailers, and/or vendors. The compartments are generally arranged to contain cargo and/or other items. In an example embodiment, one or more of the compartments may be secure compartments. The compartments 215a and 215b may have different capabilities, such as refrigeration, insulation, etc., as appropriate. It should be appreciated that the number, size, and configuration of the compartments may vary. For example, while two compartments (215a, 215b) are shown, the autonomous vehicle 101 may include more than two or less than two (e.g., zero or one) compartments.

Figure 3:
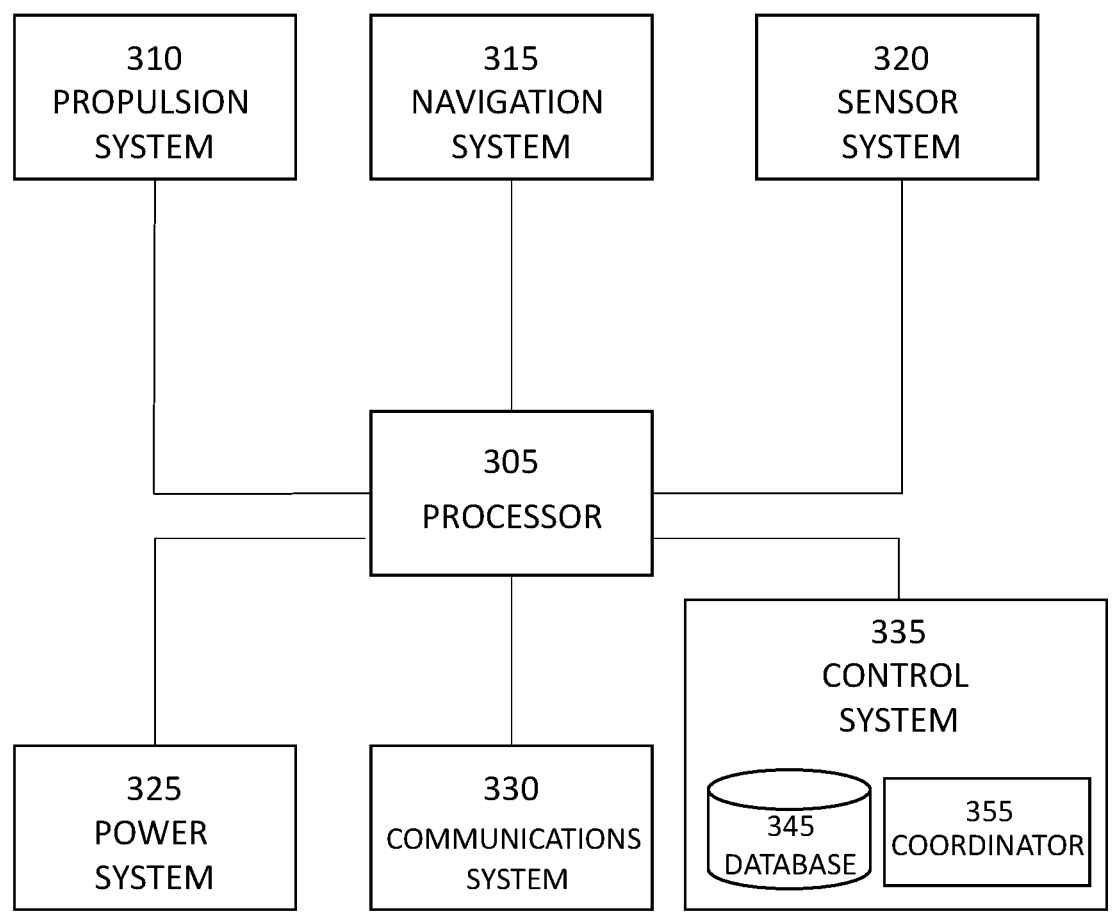
FIG. 3 is a block diagram representation of functional components of an autonomous vehicle, according to an example embodiment.

FIG. 3 is a block diagram representation of certain functional components of the autonomous vehicle 101, according to an example embodiment. With reference to FIGS. 2-3, the autonomous vehicle 101 includes a processor 305, which is operatively coupled to, and configured to send instructions to, and receive instructions from or for, various systems of the autonomous vehicle 101, including: a propulsion system 310, a navigation system 315, a sensor system 320, a power system 325, a communications system 330, and a control system 335. The processor 305 and systems are operatively coupled to, or integrated with, the body 205 (FIG. 2) of the vehicle 101 and generally cooperate to operate the autonomous vehicle 101.

The propulsion system 310 includes components configured to drive (e.g., move or otherwise convey) the autonomous vehicle 101. For example, the propulsion system 310 can include an engine, wheels, steering, and a braking system, which cooperate to drive the autonomous vehicle 101. In an example embodiment, the engine may be a gas engine, a turbine engine, an electric motor, and/or a hybrid gas/electric engine. As would be appreciated by a person of ordinary skill in the art, the propulsion system 310 may include additional or different components suitable or desirable for conveying an object, which are now known or hereinafter developed, such as one or more axles, treads, wings, rotors, blowers, rockets, propellers, and/or other components.

Although the autonomous vehicle 101 shown in FIGS. 1-2 has a 4-wheeled, 2-axle automotive configuration, this configuration is illustrative and should not be construed as being limiting in any way. For example, the autonomous vehicle 101 may have more or less than 4 wheels, more or less than 2 axles, and a non-automotive configuration in an alternative example embodiment. For example, the vehicle may be configured for travel other than land travel, such as water travel, hover travel, and/or air travel without departing from the spirit or the scope of the present disclosure.

The navigation system 315 can be configured to control the propulsion system 310 and/or provide guidance to an operator associated with the autonomous vehicle 101 to navigate the autonomous vehicle 101 through paths and/or within unstructured open or closed environments. The navigation system 315 may include, e.g., digital maps, street view photographs, and/or a global positioning system ("GPS") point. For example, the navigation system 315 may cause the autonomous vehicle 101 to navigate through an environment based on information in the digital maps and information from sensors included in the sensor system 320.

The sensor system 320 includes one or more sensors configured to view and/or monitor conditions on or around the autonomous vehicle 101. For example, the sensors can ascertain when there are objects near the autonomous vehicle 101 to enable the autonomous vehicle 101 to safely guide the autonomous vehicle 101 (via the navigation system 315) around the objects. The sensors may include, e.g., cameras (e.g., running at a high frame rate, akin to video), light detection and ranging ("LiDAR"), radar, ultrasonic sensors, microphones, altimeters, etc. In an example embodiment, the sensor system 320 includes propulsion system sensors that monitor drive mechanism performance, drive train performance, and/or power system levels.

The power system 325 is arranged to provide power to the autonomous vehicle 101. Power may be provided as electrical power, gas power, or any other suitable power, e.g., solar power or battery power. In an example embodiment, the power system 325 may include a main power source and an auxiliary power source configured to power various components of the autonomous vehicle 101 and/or to generally provide power to the autonomous vehicle 101 when the main power source does not have the capacity to provide sufficient power.

The communications system 330 is arranged to enable communication between the autonomous vehicle 101 and an external person or device. For example, the communications system 330 can be configured to enable communication via wireless local area network (WLAN) connectivity (e.g., cellular) or any other wireless or mobile communication capability now known or hereinafter developed. In an example embodiment, the communications system 330 can communicate wirelessly with a fleet management system (not shown), which is arranged to control and/or assist the autonomous vehicle 101 from a location remote from the autonomous vehicle 101. For example, the communications system 330 can generally obtain or receive data, store the data, and transmit or provide the data to the fleet management system and/or to one or more other vehicles within a fleet. The data may include, but is not limited to including, information relating to scheduled requests or orders, information relating to on-demand requests or orders, information relating to a need for the autonomous vehicle 101 to reposition itself, e.g., in response to an anticipated demand, information regarding an operational or mechanical need of the autonomous vehicle 101, etc.

In an example embodiment, the control system 335 may cooperate with the processor 305 and each of the other systems in the autonomous vehicle 101, including the propulsion system 310, the navigation system 315, the sensor system 320, the power system 325, and the communications system 330, to control operation of the autonomous vehicle 101. For example, the control system 335 may cooperate with the processor 305 and the other systems to determine where the autonomous vehicle 101 may safely travel and to detect (e.g., based on data from the sensor system 320 and/or from an external system (not shown) communicating with the autonomous vehicle 101 via the communications system 330), and navigate around, objects in a vicinity around the autonomous vehicle 101. In other words, the control system 335 may cooperate with the processor 305 and other systems to effectively determine and facilitate what the autonomous vehicle 101 may do within its immediate surroundings. For example, the control system 335 in cooperation with the processor 305 may essentially control the power system 325 and/or the navigation system 315 as part of driving or conveying the autonomous vehicle 101. Additionally, the control system 335 may cooperate with the processor 305 and communications system 330 to provide data to or obtain data from other vehicles, a fleet management server, a GPS, a personal computer, a teleoperations system, a smartphone, or any other computing device via the communications system 330.

In an example embodiment, the control system 335 includes a coordinator 355, which is configured to cooperate with a fleet management system to enable remote coordination, by the fleet management system, of operations involving the autonomous vehicle 101 and other components of a fleet ecosystem. For example, the coordinator 355 can receive instructions regarding one or more jobs assigned to the autonomous vehicle 101 and can cooperate with the processor 305 and other systems of the autonomous vehicle 101 to enable completion of the job(s).

In this context, a "job" is any action to be completed by, or with, the autonomous vehicle 101. Certain jobs may be completed fully autonomously by the autonomous vehicle 101, while other jobs may require at least some involvement by a human. Each job may include one or more tasks or a series of one or more tasks. For example, a job of transporting a package from a first location to a second location may include several tasks, including (among other things): starting the vehicle, procuring the package, identifying a preferred path from the first location to the second location, moving the vehicle along the preferred path to the second location, and providing the package to a designated recipient.

Each job may involve activities that are relevant to fleet operations, vehicle operations, or other matters. For example, certain jobs can include support and maintenance activities, like completing a calibration, charging a battery, updating a map software, cleaning an interior or exterior of the vehicle, troubleshooting a problem, etc. As would be recognized by a person of ordinary skill in the art, the jobs and tasks described herein are illustrative and should not be construed as being limiting in any way.

In an example embodiment, the control system 335 further includes a database 345, which includes information, which may be referenced to complete a job or one or more tasks associated with a job. For example, the database 345 may include, for each job and/or task (or type of job and/or task), one or more sets of instructions that the autonomous vehicle 101 can execute, e.g., via the processor 305 or via one or more of the systems of the autonomous vehicle 101 (i.e., the propulsion system 310, the navigation system 315, the sensor system 320, the power system 325, the communications system 330, and other components of the control system 335), to complete the job. The database 345 also may include one or more sets of information, which can be used or input in connection with one or more sets of instructions, which may or may not be stored in the database 345. The database 345 includes data stores or storage structures (e.g., files, databases, data structures, data or other repositories, etc.) that are configured to store information. Though depicted in FIG. 3 as being located within the autonomous vehicle 101, it should be recognized that the database 345 could be located remote from the autonomous vehicle 101, e.g., in a cloud or data center solution, in alternative example embodiments.

Figure 4:
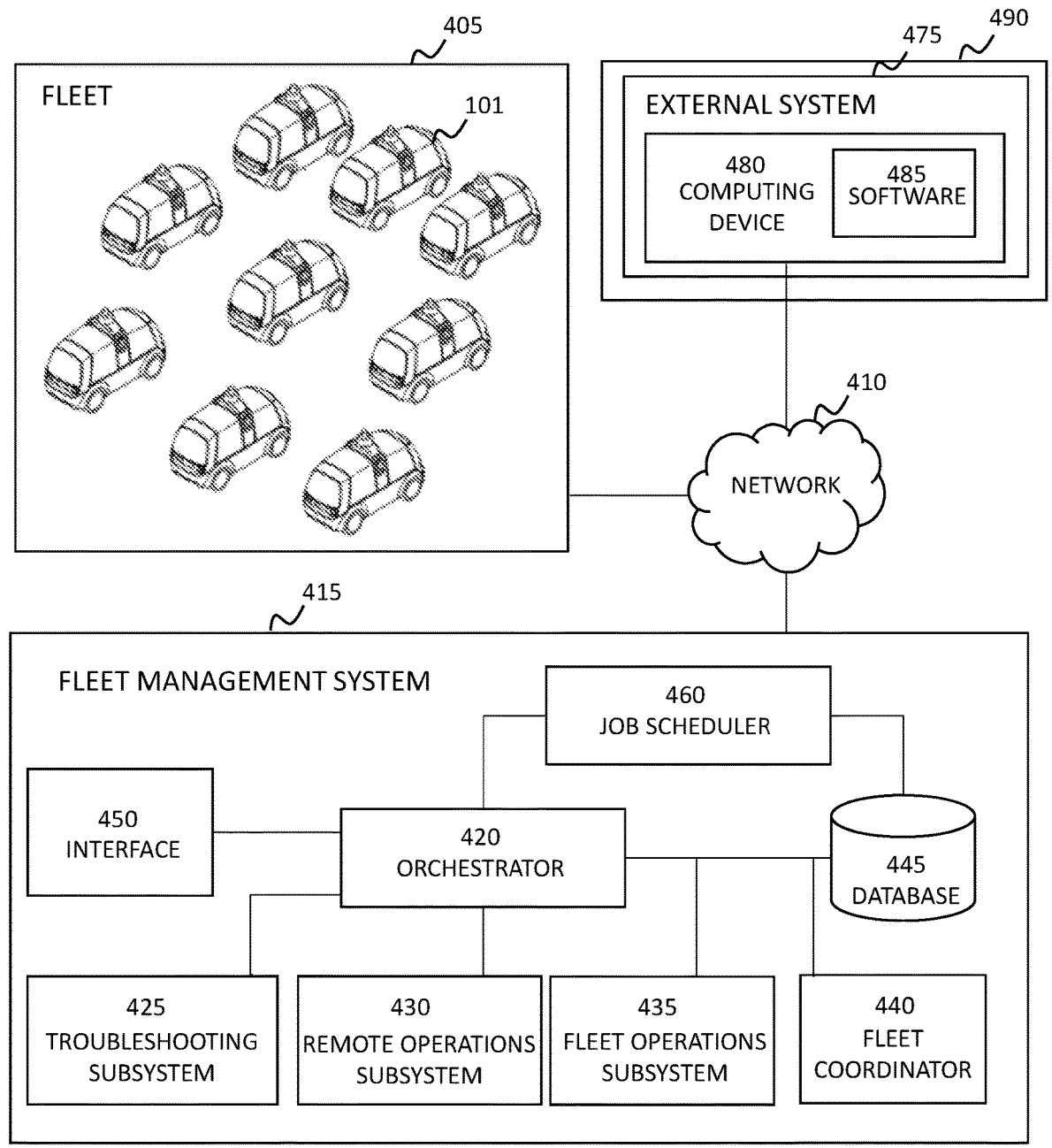
FIG. 4 is a block diagram representation of functional components of an interconnected autonomous vehicle fleet ecosystem, according to an example embodiment.

FIG. 4 is a block diagram representation of functional components of an interconnected autonomous vehicle fleet ecosystem 400, according to an example embodiment. The ecosystem 400 includes an autonomous vehicle fleet 405 including a plurality of autonomous vehicles 101. The autonomous vehicles 101 in the autonomous vehicle fleet 405 are interconnected with one another, a fleet management system 415, and at least one system external to the fleet management system (an "external system") 475 via at least one network 410. The network 410 can include any communications medium for transmitting information between two or more computing devices. For example, the network 410 can include a wireless local area network (WLAN)

capability (e.g., cellular) or any other wireless or mobile communication capability now known or hereinafter developed.

The fleet management system 415 includes an orchestrator 420, which is configured to coordinate operations of the ecosystem 400, including remotely coordinating operations of the autonomous vehicle fleet 405. The orchestrator 420 is operatively coupled to, and configured to send instructions to, and receive instructions from or for, various subsystems of the fleet management system 415, including: a troubleshooting subsystem 425, a remote operations subsystem 430, a fleet operations subsystem 435, a fleet coordinator 440, an interface 450, and a job scheduler 460.

The job scheduler 460 is configured to assign jobs to the autonomous vehicles 101 based on a variety of considerations, including, e.g., constraints for the autonomous vehicles 101 and any human operators and/or physical infrastructure required to compete each job. For example, job assignments may include considerations of route locations, route driving times, route distances, vehicle locations, vehicle ranges, vehicle charging statuses/needs, parking needs, vehicle storage capacities, capabilities, and/or configurations, relative job priorities, any associations between particular vehicles and particular job sites, etc.

In an example embodiment, the job scheduler 460 is configured to cooperate with the orchestrator 420 and other subsystems of the fleet management system 415 to create and/or change job assignments dynamically. For example, during job planning or execution, the job scheduler 460 may create and/or change job assignments to resolve issues as they arise or to increase operational efficiencies. The job scheduler 460 may operate autonomously or via input from one or more operators. For example, one or more operators may interact with the job scheduler 460 via a user interface provided by the job scheduler 460 to schedule jobs and assign them to vehicles 101.

A database 445 is configured to store information regarding various different types of potential jobs, and tasks associated with the different types of potential jobs, as well as known constraints for the autonomous vehicles 101, operators, and physical infrastructure. For example, the job scheduler 460 may reference this information when assigning jobs. The job scheduler 460 also can store in the database 445 information regarding assigned jobs, such as relative priorities of the jobs, an expected start time and completion time for each job and task thereof, and an identity of each vehicle/system/operator associated with each job/task. The database 445 includes data stores or storage structures (e.g., files, databases, data structures, data or other repositories, etc.) that are configured to store information. Though depicted in FIG. 4 as being located within the fleet management system 415, it should be recognized that the database 445 could be located remote from the fleet management system 415, e.g., in a cloud or data center solution, in alternative example embodiments.

The orchestrator 420 is configured to monitor completion of assigned jobs and coordinate completion of tasks by the autonomous vehicles 101 and the other subsystems of the fleet management system 415 in order to enable completion of the assigned jobs. The orchestrator 420 can identify, for each job (or type of job), a plurality of tasks to be completed. For example, the database 445 can include, and the orchestrator 420 can read and consider, information indicating tasks to be performed for each job (or type of job), along with each subsystem (or the vehicle, if applicable) responsible for completing and/or coordinating each task, and any other information necessary or desirable for facilitating completion of the tasks.

The troubleshooting subsystem 425 is configured to obtain information from the autonomous vehicles 101 that indicates whether any of the autonomous vehicles 101 have issues, e.g., health issues, that are affecting, or are about to affect, the ability of the autonomous vehicles 101 to function. For example, the autonomous vehicles 101 may be configured to self-report issues or may be configured to provide general information from which the troubleshooting subsystem 425 may detect issues. The troubleshooting subsystem 425 can process information from the autonomous vehicles 101 to diagnose and address issues. In an example embodiment, the troubleshooting subsystem 425 may be configured to diagnose and address certain issues fully autonomously and to escalate certain other issues for input and/or action by a human operator via a user interface provided by the troubleshooting subsystem 425. For example, the troubleshooting subsystem 425 may be configured to diagnose and address certain predefined health issues using information in the database 445. The troubleshooting subsystem 425 also may be configured to coordinate with the orchestrator 420 to cause one or more rescue or replacement vehicles to be dispatched as needed.

The remote operations subsystem 430 is configured to enable remote operation of the autonomous vehicles 101 via teleoperations and/or remote control mechanisms. For example, the remote operations subsystem 430 can include communication/processing equipment and at least one human operation station through which a human operator can operate and/or remotely control an autonomous vehicle 101. A teleoperations subsystem can include, for example, a driver seat, a steering wheel, acceleration and brake pedals, a gear shifter, and a visual interface that is configured to allow a human operator to view the environment in which an autonomous vehicle 101 that is to be driven or otherwise controlled by the human operator station is driving. Similarly, a remote control subsystem can include a handheld or other remote controlled device through which a human can drive or otherwise control an autonomous vehicle 101.

In an example embodiment, the remote operations subsystem 430 may take control over an autonomous vehicle 101 in response to a request for such action by the autonomous vehicle 101 or based on a behavior or situation observed by the fleet management system 415. For example, the orchestrator 420 may cause the remote operations subsystem 430 to take control over the autonomous vehicle 101 in response to a determination that the autonomous vehicle 101 is unable to safely and/or effectively complete a particular job or task autonomously. In an example embodiment, the orchestrator 420 may coordinate operations between the remote operations subsystem 430, the troubleshooting subsystem 425, the fleet operations subsystem 435, and the fleet coordinator 440 to effectively decommission and recover autonomous vehicles 101 in need of service.

The fleet operations subsystem 435 is configured to coordinate maintenance and servicing of autonomous vehicles 101 in the fleet 405. For example, the fleet operations subsystem 435 can schedule and coordinate planned (e.g., routine) and unplanned (e.g., emergency) servicing, cleaning, charging, and other maintenance activities. The fleet operations subsystem 435 also may be configured to remotely start the autonomous vehicles 101 from a dormant state, e.g., through a "one-click" or other remote startup operation. For example, the fleet operations subsystem 435 may determine, based on health and/or configuration information for an autonomous vehicle 101 and/or a job associated with the autonomous vehicle 101, whether the autonomous vehicle 101 is ready to operate.

The fleet coordinator 440 is configured to oversee the general operations of the autonomous vehicles 101 in the fleet 405 and to coordinate, via the orchestrator 420, with the job scheduler 460 and other subsystems of the fleet management system 415 to make any necessary scheduling or job assignment adjustments. For example, the fleet coordinator 440 may cause one or more jobs from a first autonomous vehicle 101 to be reassigned to at least one other autonomous vehicle 101 if the first autonomous vehicle 101 is removed from service. The fleet coordinator 440 also may coordinate delivery of a new, replacement autonomous vehicle 101 if an autonomous vehicle 101 is recovered.

The fleet coordinator 440 may operate autonomously or via input from one or more operators. For example, one or more operators may interact with the fleet coordinator 440 via a user interface provided by the fleet coordinator 440 to view, update, and take action with respect to status, health, and job information for the autonomous vehicles 101 and/or for groups of autonomous vehicles 101 within the fleet 405.

The interface 450 is configured to enable interactions between the fleet management system 415 and at least one external system 475 of an entity 490. The entity 490 is a customer, partner, or other person or company/enterprise that receives, provides, or facilitates the provision of goods or services in connection with the autonomous vehicles 101. In an example embodiment, a computing device 480 of the entity 490 can view, update, and take action with respect to autonomous vehicles 101 and/or jobs/tasks associated with the entity 490 via the interface 450. For example, the interface 450 can provide a graphical user interface through which a customer, partner, or other entity 490 can view current status information regarding a pending or completed job, a particular autonomous vehicle 101 or group of autonomous vehicles 101, etc.

In addition to, or in lieu of, providing a user interface, the interface 450 can communicate with the computing device 480 to provide and/or collect information associated with the autonomous vehicles 101, jobs/tasks, etc. For example, the interface 450 can receive and answer questions from an operator of the computing device 480. The interface 450 may operate autonomously or via input from one or more operators of the fleet management system 415. For example, the interface 450 may provide a user interface through which one or more operators may interact to communicate with the external system 475.

Each user device 480 includes a computer or processing system, such as a desktop, laptop, tablet, phone, scanner, or other mobile or non-mobile device. Each user device 480 may include, for example, one or more types of displays (e.g., a screen or monitor) and input devices (e.g., a keyboard, mouse, voice recognition, etc.) to enter and/or view information. Each user device 480 includes software 485, such as an internet browser or software application, through which the user device 480 communicates with the interface 450.

Figure 5A:
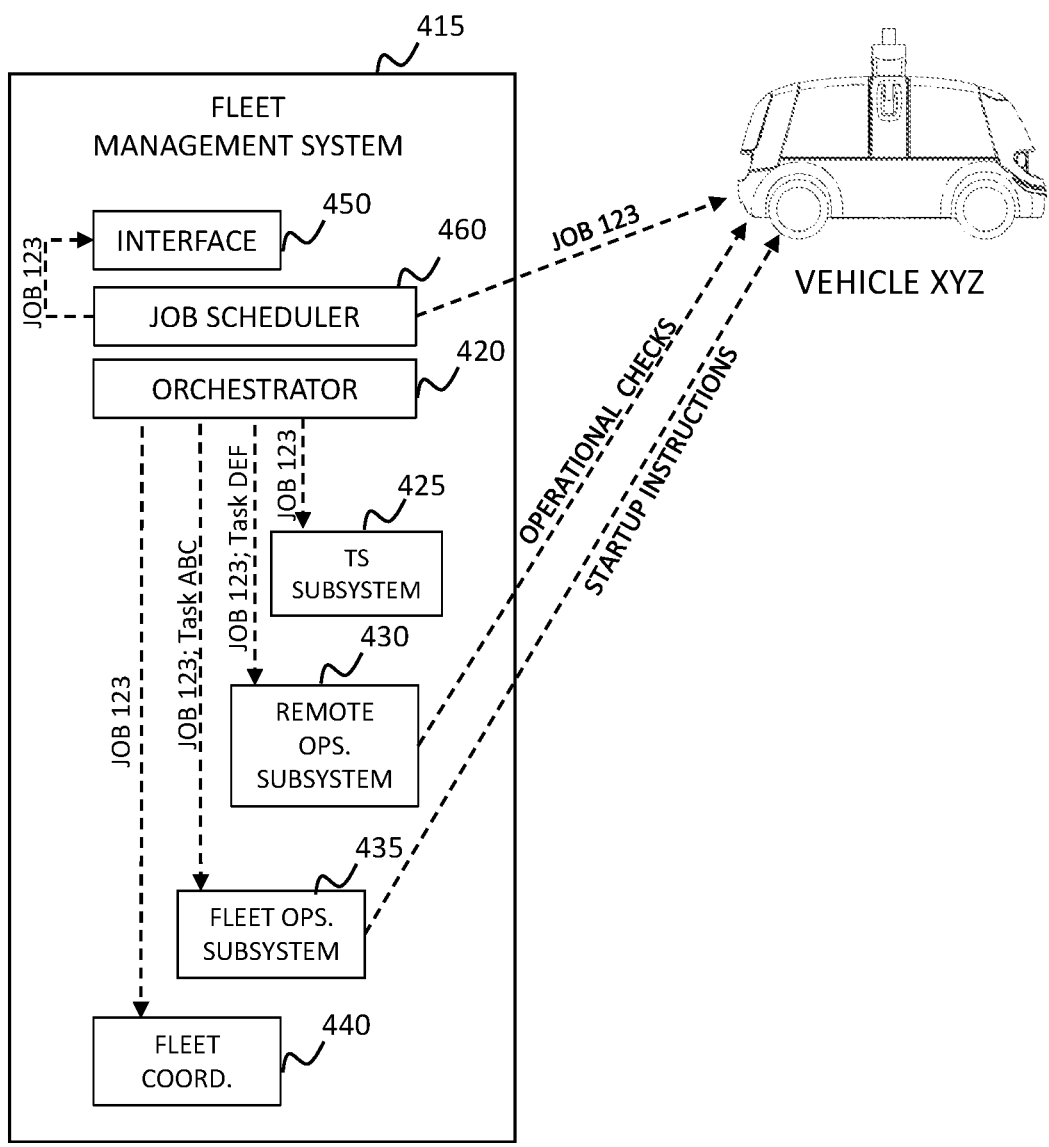
FIGS. 5A and 5B are diagrams depicting an operational flow for remotely coordinating autonomous vehicle fleet operations, according to an example embodiment.
Figure 5B:
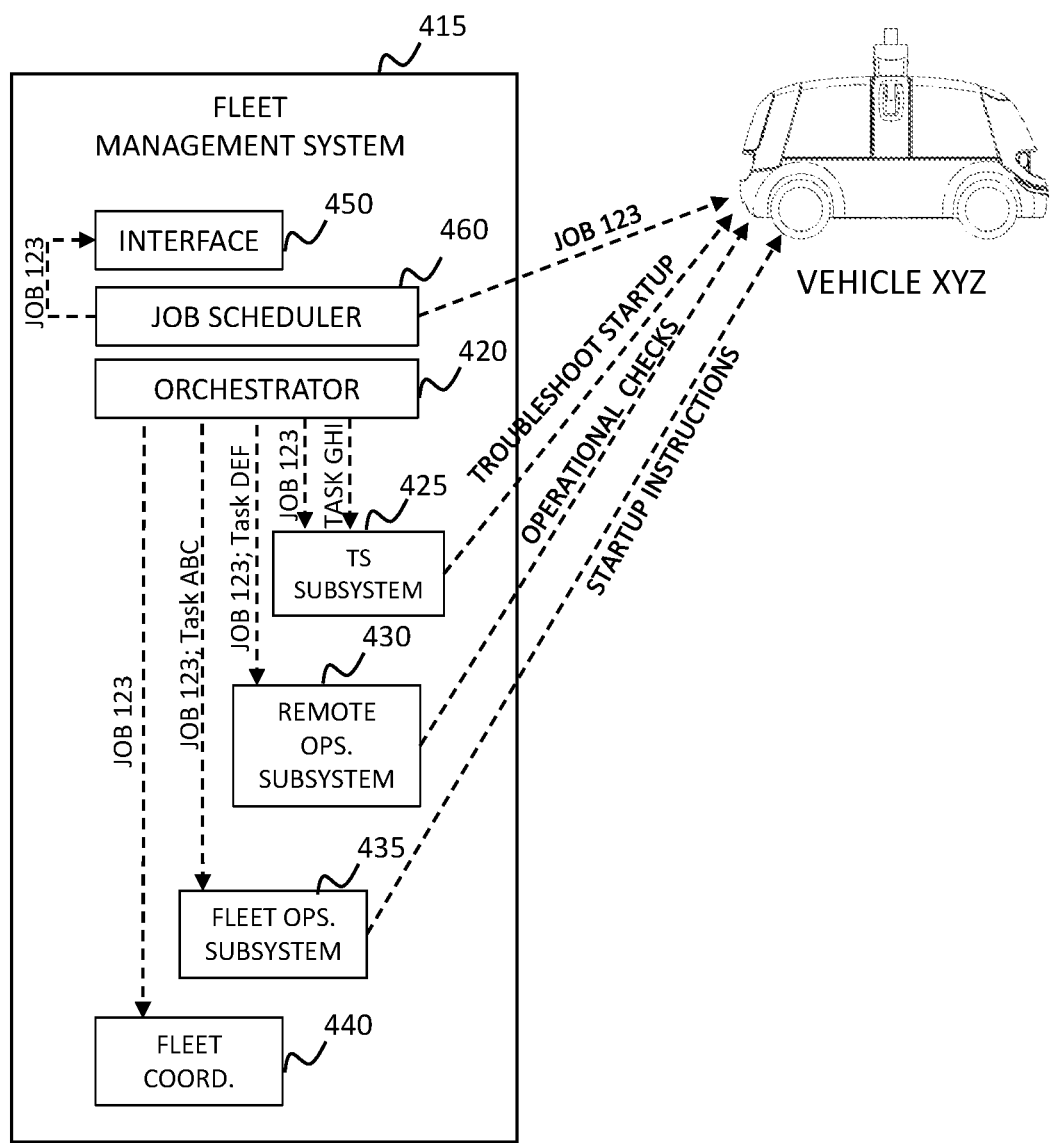

FIGS. 5A and 5B are diagrams depicting an operational flow 500 for remotely coordinating autonomous vehicle fleet operations, according to an example embodiment. The job scheduler 460 identifies a delivery to be completed by an autonomous vehicle. The job scheduler 460 selects autonomous vehicle XYZ ("Vehicle XYZ") to complete the delivery and creates job 123 ("Job 123") for the delivery. The job scheduler 460 provides information regarding Job 123 to Vehicle XYZ, the interface 450, and/or other subsystems of the fleet management system 415 for tracking, operational, and other purposes. For example, the job scheduler 460 may provide route, software version, and other information to Vehicle XYZ, the interface 450, and/or one or more other subsystems of the fleet management system 415.

The orchestrator 420 identifies a series of tasks to be completed by Vehicle XYZ and/or the subsystems of the fleet management system 415 in order to enable Vehicle XYZ to complete Job 123. For example, the orchestrator 420 may identify a task ABC ("Task ABC") to be completed by the fleet operations subsystem 435 and a task DEF ("Task DEF") to be completed by the remote operations subsystem 430. Task ABC may be, for example, a task or series of tasks associated with remotely starting Vehicle XYZ. For example, the fleet operations subsystem 435 may be configured to remotely start Vehicle XYZ from a dormant state, e.g., through a "one-click" or other remote startup operation. Task DEF may be, for example, a task or series of tasks associated with completing operational checks (e.g., one or more disengagement or calibration checks) of Vehicle XYZ.

In an example embodiment, one or more user interfaces associated with the subsystems of the fleet management system 415 can display information regarding Job 123, Task ABC, Task DEF, and/or Vehicle XYZ. For example, an interface associated with the fleet operations subsystem 435 can display information regarding Task ABC in a notification and/or a queue for operator technicians to take action to initiate the startup of Vehicle XYZ. Similarly, an interface associated with the remote operations subsystem 430 may display information regarding Task DEF in a notification and/or a queue for operator technicians to take action to initiate the operational checks. Alternatively, if the tasks are performed substantially autonomously by the subsystems, each interface may display information only for informational purposes, each interface may not display information, or the interface(s) may not be provided. In addition, status and related information regarding Job 123, Task ABC, Task DEF, or Vehicle XYZ may be provided by the interface 450 to one or more external devices (not shown), such as a computing device of a recipient or sender of the delivery.

If Task ABC and Task DEF are successfully completed, the orchestrator 420 may continue to coordinate additional tasks required to complete Job 123. However, if a problem is encountered prior to completion of Task ABC or Task DEF, or if circumstances change during task planning or execution, the orchestrator 420 may create and/or change task assignments dynamically. For example, as illustrated in FIG. 5B, if Vehicle XYZ encounters an issue during startup (i.e., during Task ABC) that requires troubleshooting, the orchestrator 420 may create a new task GHI ("Task GHI") for the troubleshooting subsystem 425 to troubleshoot the issue with Vehicle XYZ. Once the troubleshooting subsystem 425 successfully resolves the issue, the orchestrator 420 can cause the remaining tasks to be completed, i.e., the orchestrator 420 can cause the remote operations subsystem 430 to start Task DEF and then cause any other required tasks for Job 123 to be completed.

As would be recognized by a person of ordinary skill in the art, the jobs and tasks described herein, as well as the systems and subsystems presented for handling the jobs and tasks, are illustrative and should not be construed as being limiting in any way. For example, it should be apparent that additional or different jobs and tasks may be included in alternative example embodiments.

Figure 6:
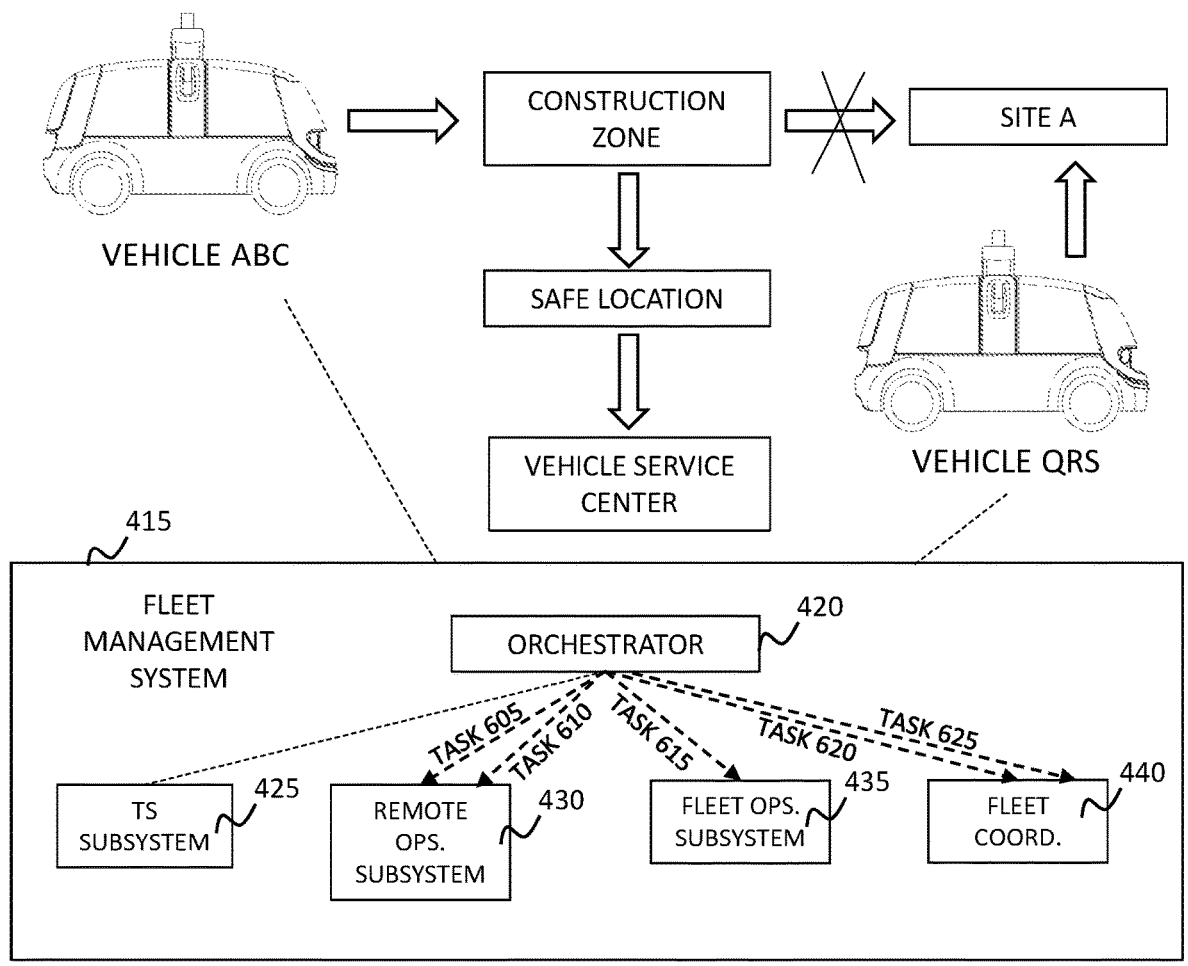
FIG. 6 is a diagram depicting an operational flow for remotely coordinating autonomous vehicle fleet operations, according to another example embodiment.

FIG. 6 is a diagram depicting an operational flow 600 for remotely coordinating autonomous vehicle fleet operations, according to another example embodiment. The orchestrator 420 monitors an autonomous vehicle ABC ("Vehicle ABC"), which is completing a delivery job. The delivery job involves Vehicle ABC traveling to site A ("Site A"). While traveling to Site A, Vehicle ABC encounters a construction zone.

The orchestrator 420, e.g., based on information from the remote operations subsystem 430 and/or from Vehicle ABC, determines that Vehicle ABC requires remote support from the remote operations subsystem 430 in order to travel safely through the construction zone. For example, Vehicle ABC can request remote support or the remote operations subsystem 430 can provide such support automatically based on a determination by the remote operations subsystem 430 that Vehicle ABC is unable to safely and/or effectively travel through the construction zone autonomously. The orchestrator 420 creates and assigns to the remote operations subsystem 430 a task 605 ("Task 605") to provide assistance to Vehicle ABC in driving through the construction zone. Task 605 may include a single task or a series of tasks.

The remote operations subsystem 430 accepts the request and gains context, slowing a speed of Vehicle ABC and causing Vehicle ABC to travel through the construction zone, thereby completing Task 605. Moments later, a Malfunction Indicator Light (e.g., tire pressure) illuminates; it appears as though a tire of Vehicle ABC was punctured in the construction zone. The orchestrator 420 creates and assigns to the remote operations subsystem 430 a new task 610 of conducting a pullover of Vehicle ABC to a safe location. In addition, the orchestrator 420 creates and assigns to the fleet operations subsystem 435 a new task 615 of recovering Vehicle ABC for service.

The remote operations subsystem 430 completes task 610 by causing Vehicle ABC to pull over to the safe location through teleoperations, remote control, or another remote operations mechanism. The fleet operations subsystem 435 completes task 615 by causing a recovery vehicle to tow Vehicle ABC to a vehicle service center. The orchestrator 420 creates and assigns to the fleet coordination subsystem 440 a task 620 of decommissioning Vehicle ABC (i.e., marking Vehicle ABC as "down," "unavailable," or the like) and a task 625 of reassigning the job (and tasks) of Vehicle ABC to a new vehicle, Vehicle QRS. The orchestrator 420 also can cause updated information regarding the job, such as a new delivery time estimate, to be propagated throughout the ecosystem, including to subsystems of the fleet management system 415, one or more other autonomous vehicles in the fleet, and associated external systems.

As would be recognized by a person of ordinary skill in the art, the jobs and tasks described herein, as well as the systems and subsystems presented for handling the jobs and tasks, are illustrative and should not be construed as being limiting in any way. For example, it should be apparent that additional or different jobs and tasks may be included in alternative example embodiments.

Figure 7:
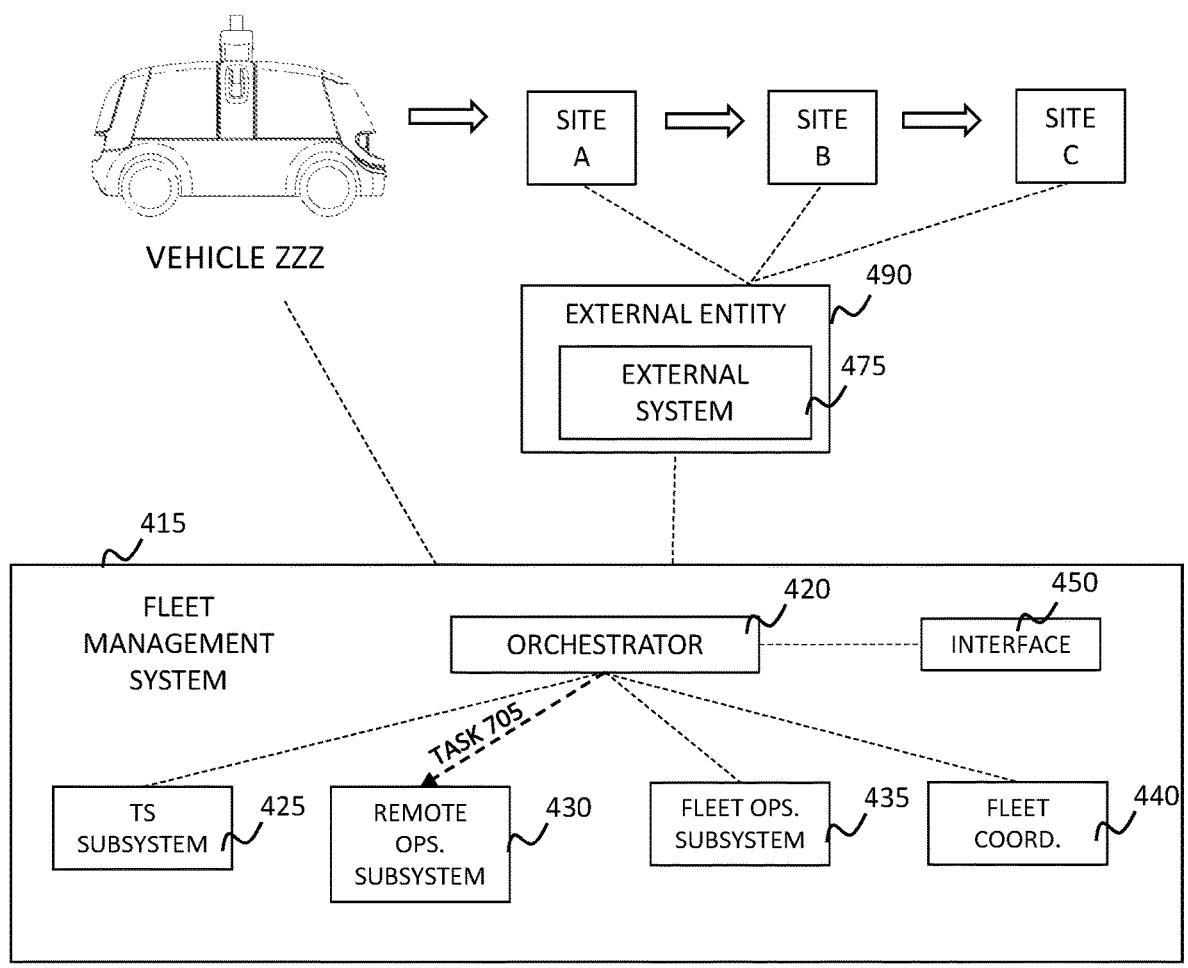
FIG. 7 is a diagram depicting an operational flow for remotely coordinating autonomous vehicle fleet operations, according to yet another example embodiment.

FIG. 7 is a diagram depicting an operational flow 700 for remotely coordinating autonomous vehicle fleet operations, according to yet another example embodiment. The orchestrator 420 monitors an autonomous vehicle ZZZ ("Vehicle ZZZ"), which is completing a series of delivery jobs. The delivery jobs involve Vehicle ZZZ traveling to Site A to pick up a package, traveling to site B to drop off the package, and then traveling to site C to pick up a new package.

Vehicle ZZZ successfully travels to Site A. One or more individuals at Site A are notified via a computing device connected to an external system 475 to load Vehicle ZZZ with the package. For example, the computing device can include a computer or processing system, such as a desktop, laptop, tablet, phone, or other mobile or non-mobile device. The computing device can include software, such as an internet browser or software application, through which the computing device communicates with the interface 450 to receive the notification. The notification can include information regarding Vehicle ZZZ, the delivery job, etc., such as an estimated time of arrival of Vehicle ZZZ, an identifier or description of Vehicle ZZZ, authentication information for the package, etc. For example, the orchestrator 420 can create a task for the interface 450, which causes the interface 450 to provide the notification.

Once the package is successfully loaded into Vehicle ZZZ, Vehicle ZZZ travels to Site B. One or more individuals at Site B are notified via a computing device connected to an external system 475 that Vehicle ZZZ has arrived (or will be arriving shortly). For example, the computing device can communicate with the interface 450 to receive the notification. The notification can include information regarding Vehicle ZZZ, the delivery job, etc., such as an estimated time of arrival of Vehicle ZZZ, an identifier or description of Vehicle ZZZ, authentication information for the package, etc. For example, the orchestrator 420 can create a task for the interface 450, which causes the interface 450 to provide the notification.

An individual at Site B attempts to retrieve the package from Vehicle ZZZ but experiences difficulty opening the doors to the Vehicle ZZZ; the doors appear to be stuck. The orchestrator 420 creates and assigns to the remote operations subsystem 430 a new task 705 to provide real-time (or near real-time) assistance to the individual at Site B. For example, the new task 705 may involve a series of tasks, such as (a) completing a two-way communication with the individual to verify their identity, and (b) upon successful authentication of the individual, remotely opening the doors for the individual. The remote operations subsystem 430 successfully completes the task 705, opening the doors for the individual who retrieves the package. Given that the issue appears to have been user error (and not a mechanical problem on Vehicle ZZZ), the orchestrator 420 allows the job to continue as originally planned, with Vehicle ZZZ continuing on to Site C.

As would be recognized by a person of ordinary skill in the art, the jobs and tasks described herein, as well as the systems and subsystems presented for handling the jobs and tasks, are illustrative and should not be construed as being limiting in any way. For example, it should be apparent that additional or different jobs and tasks may be included in alternative example embodiments.

Figure 8:
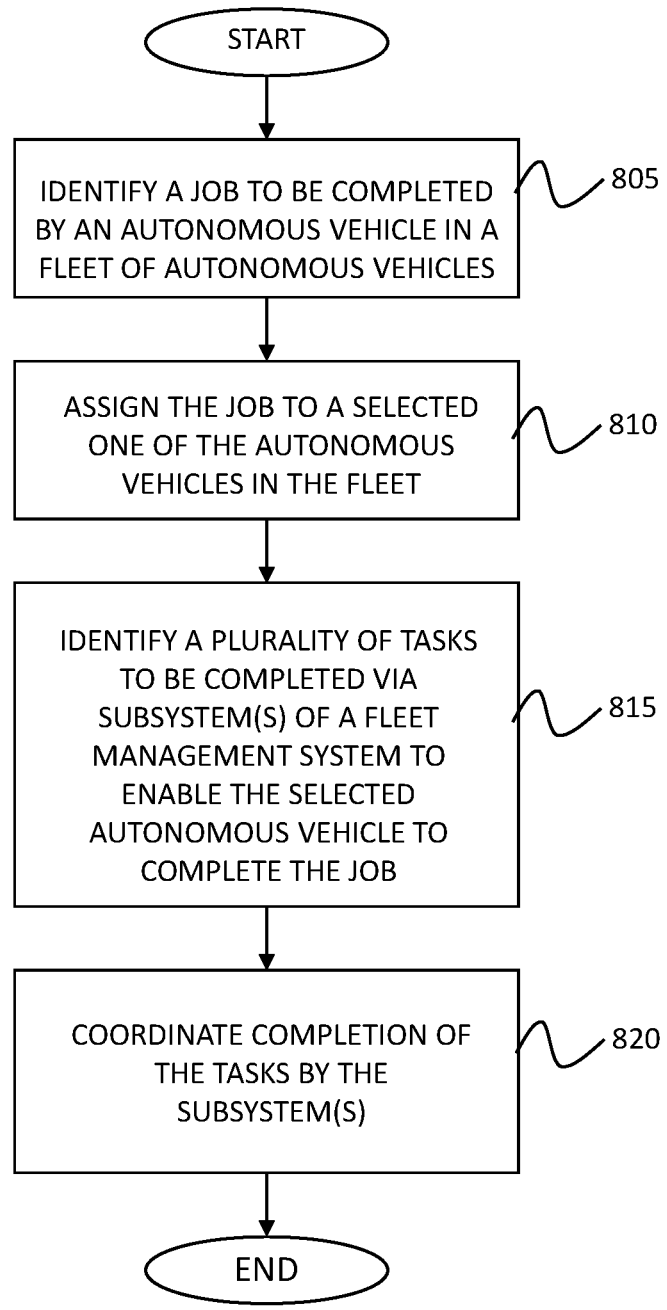
FIG. 8 is a process flow diagram illustrating a method of remotely coordinating autonomous vehicle fleet operations, according to an example embodiment.

FIG. 8 is a process flow diagram illustrating a method 800 of remotely coordinating autonomous vehicle fleet operations, according to an example embodiment. In step 805, a fleet management system identifies a job to be completed by an autonomous vehicle in a fleet of autonomous vehicles. For example, the job may be identified by a job scheduler, orchestrator, and/or another subsystem of the fleet management system.

The job is an action to be completed by, or with, the autonomous vehicle and may involve activities that are relevant to fleet operations, vehicle operations, or other matters. For example, the job can include traveling from a first location to a second location, transporting a package from a first location to a second location, and/or one or more support/maintenance activities, like completing a calibration, charging a battery, updating a map software, cleaning an interior or exterior of the vehicle, troubleshooting a problem, etc.

The job may be completed fully autonomously by the autonomous vehicle or it may require at least some involvement by a human. The job may include one or more tasks or a series of one or more tasks. For example, a job of transporting a package from a first location to a second location may include several tasks, including (among other things): starting the vehicle, procuring the package, identifying a preferred path from the first location to the second location, moving the vehicle along the preferred path to the second location, and providing the package to a designated recipient. As would be recognized by a person of ordinary skill in the art, the jobs and tasks described herein are illustrative and should not be construed as being limiting in any way.

In step 810, the job is assigned to a selected one of the autonomous vehicles in the fleet. The autonomous vehicle may be selected and assigned based on a variety of considerations, including, e.g., constraints for the autonomous vehicles and any human operators and/or physical infrastructure required to compete each job. For example, the job assignment may include consideration of one or more route locations, route driving times, route distances, vehicle locations, vehicle ranges, vehicle charging statuses/needs, parking needs, vehicle storage capacities and/or configurations, relative job priorities, any associations between particular vehicles and particular job sites, etc.

A job scheduler, orchestrator, or other fleet management system component can assign the job autonomously or via input from one or more operators. For example, one or more operators may interact with the job scheduler via a user interface provided by the job scheduler to schedule jobs and assign them to autonomous vehicles.

In step 815, the orchestrator identifies a plurality of tasks to be completed via subsystems of the fleet management system to enable the selected autonomous vehicle to complete the job. The orchestrator can identify the tasks, for example, by referencing task and job information stored in a database of the fleet management system. For example, the database can include information indicating tasks to be performed for each job (or type of job), along with the subsystem(s) responsible for each task, and any other information necessary or desirable for facilitating completion of the tasks.

In an example embodiment, the orchestrator is configured to create and/or change task assignments dynamically. For example, during task planning or execution, the orchestrator may create and/or change task assignments to resolve issues as they arise or to increase operational efficiencies. The orchestrator may operate autonomously or via input from one or more operators. For example, one or more operators may interact with the orchestrator via a user interface provided by the orchestrator to schedule tasks and assign them to subsystems. In step 820, the orchestrator coordinates completion of the tasks by the subsystem(s).

Figure 9:
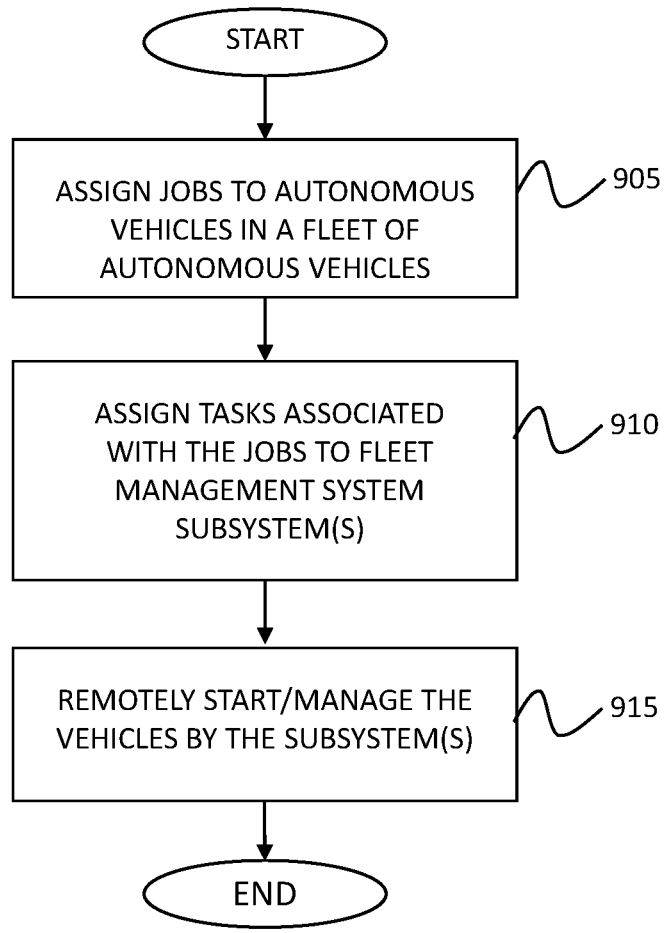
FIG. 9 is a process flow diagram illustrating a method of remotely coordinating autonomous vehicle fleet operations, according to another example embodiment.

FIG. 9 is a process flow diagram illustrating a method 900 of remotely coordinating autonomous vehicle fleet operations, according to another example embodiment. In step 905, a fleet management system assigns jobs to autonomous vehicles in a fleet of autonomous vehicles. Each job is an action to be completed by, or with, the autonomous vehicle to which it is assigned and may involve activities that are relevant to fleet operations, vehicle operations, or other matters. For example, the fleet management system may assign jobs for purposes of transporting, delivering, and/or retrieving goods and/or services via the autonomous vehicles. Each job may be identified and/or assigned by a job scheduler, orchestrator, and/or other subsystem of the fleet management system.

For each job, a corresponding autonomous vehicle may be selected and assigned based on a variety of considerations, including, e.g., constraints for the autonomous vehicles and any human operators and/or physical infrastructure required to compete each job. For example, the job assignment may include consideration of one or more route locations, route driving times, route distances, vehicle locations, vehicle ranges, vehicle charging statuses/needs, parking needs, vehicle storage capacities, capabilities, and/or configurations, relative job priorities, any associations between particular vehicles and particular job sites, etc. Each job may be completed fully autonomously by the assigned autonomous vehicle or it may require at least some involvement by a human. For example, a job can include traveling from a first location to a second location, transporting a package from a first location to a second location, and/or one or more support/maintenance activities, like completing a calibration, charging a battery, updating a map software, cleaning an interior or exterior of the vehicle, troubleshooting a problem, etc.

Each job may include one or more tasks or a series of one or more tasks. For example, a job of transporting a package from a first location to a second location may include several tasks, including (among other things): starting the vehicle, procuring the package, identifying a preferred path from the first location to the second location, moving the vehicle along the preferred path to the second location, and providing the package to a designated recipient. As would be recognized by a person of ordinary skill in the art, the jobs and tasks described herein are illustrative and should not be construed as being limiting in any way.

A job scheduler, orchestrator, or other fleet management system component can assign the jobs autonomously or via input from one or more operators. For example, one or more operators may interact with the job scheduler via a user interface provided by the job scheduler to schedule jobs and assign them to autonomous vehicles.

In step 910, the orchestrator assigns tasks associated with the jobs to fleet management system subsystems in order to enable the autonomous vehicles to complete their respective jobs. The orchestrator can identify the tasks, for example, by referencing task and job information stored in a database of the fleet management system. For example, the database can include information indicating tasks to be performed for each job (or type of job), along with the subsystem(s) responsible for each task, and any other information necessary or desirable for facilitating completion of the tasks.

In an example embodiment, the orchestrator is configured to create and/or change task assignments dynamically. For example, during task planning or execution, the orchestrator may create and/or change task assignments to resolve issues as they arise or to increase operational efficiencies. The orchestrator may operate autonomously or via input from one or more operators. For example, one or more operators may interact with the orchestrator via a user interface provided by the orchestrator to schedule tasks and assign them to vehicles and sub systems.

In step 915, the fleet management system remotely starts and/or manages the autonomous vehicles via the orchestrator and other subsystems. For example, the orchestrator can cause one or more of the autonomous vehicles to start from a dormant state, e.g., through a "one-click" or other remote startup operation. Alternatively, the orchestrator can monitor and/or control operations of autonomous vehicles that already have been started. For example, a first task or series of tasks for an autonomous vehicle that already has been started may include one or more operational checks, such as a disengagement or calibration check of the autonomous vehicle.

The fleet management system also can configure the autonomous vehicles and subsystems based on job/task parameters. For example, if an autonomous vehicle is assigned a job involving delivery of cold items, the autonomous vehicle may be configured to deliver the cold items in part by providing refrigeration capabilities in at least one compartment of the autonomous vehicle. Configuring the autonomous vehicles also may include, for example, configuring sensors, software, and/or other hardware or software components of the autonomous vehicles.

Figure 10:
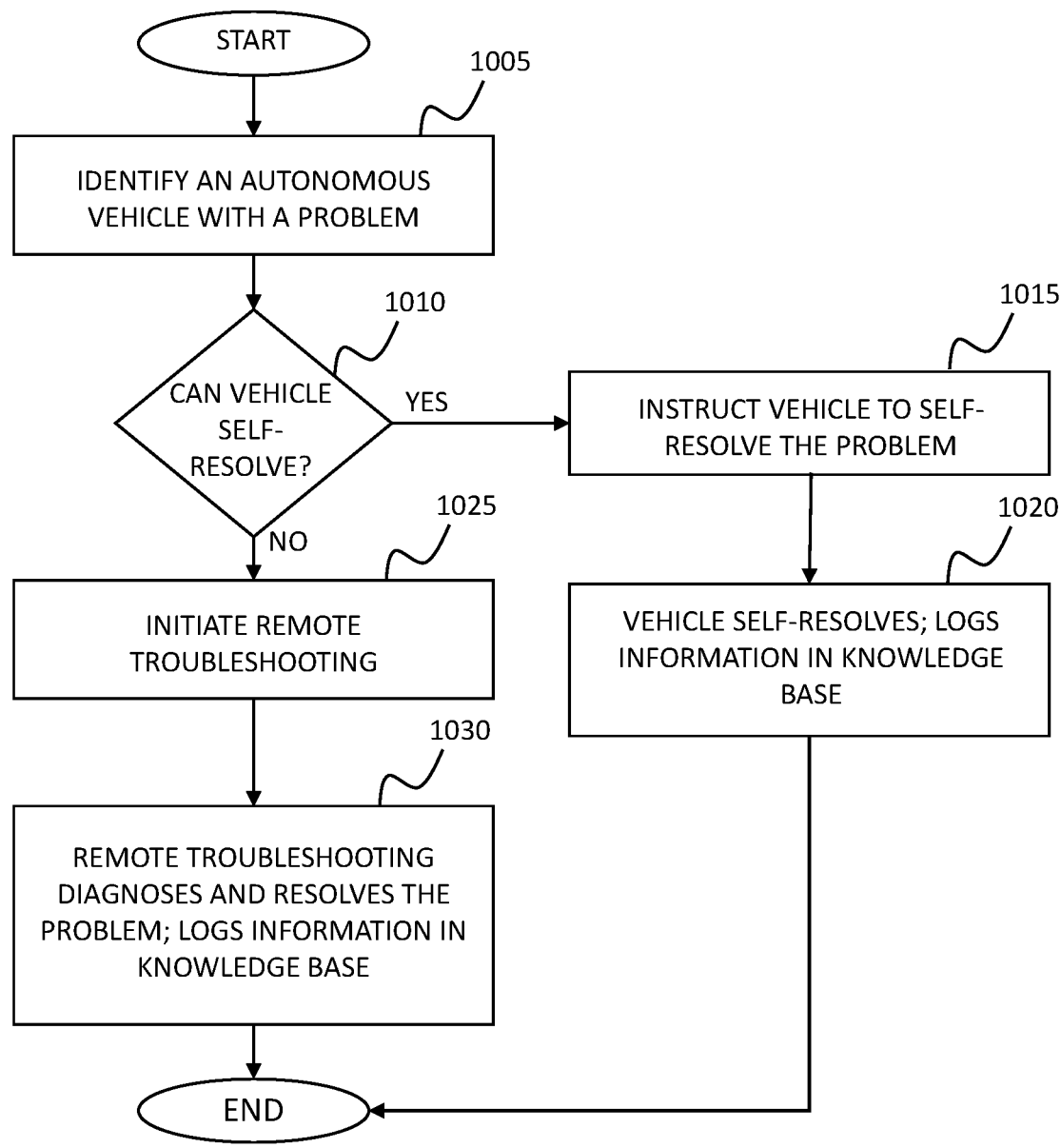
FIG. 10 is a process flow diagram illustrating a method of remotely coordinating troubleshooting support for an autonomous vehicle, according to an example embodiment.

FIG. 10 is a process flow diagram illustrating a method 1000 of remotely coordinating troubleshooting support for an autonomous vehicle, according to an example embodiment. In step 1005, a fleet management system identifies an autonomous vehicle with a problem. For example, the autonomous vehicle may have a mechanical or other health or operational problem, which may require technical support. The autonomous vehicle may be identified from a request by the autonomous vehicle for help or based on information observed or detected by the fleet management system. For example, an orchestrator of the fleet management system may monitor the autonomous vehicle, e.g., via one or more other subsystems of the fleet management system, and determine, based on that monitoring that the autonomous vehicle has a problem.

In step 1010, the fleet management system determines whether the autonomous vehicle can self-resolve the problem. For example, a troubleshooting subsystem of the fleet management system, in cooperation with an orchestrator of the fleet management system, may determine a scope of the problem, potential solutions for the problem, and whether the potential solutions can be managed and/or completed by the autonomous vehicle. The troubleshooting subsystem can make this determination, e.g., based on input from the autonomous vehicle and/or information stored in a database of the fleet management system. For example, the database may include information regarding various problems or problem types and associated solutions and systems for resolution. The database also may include instructions for resolving certain problems and/or logic for determining a resolution plan or prioritized list of resolution options. For example, self-resolving a problem may include causing an internal system to be rebooted or at least temporarily terminating a system that has been identified as being unhealthy.

If the fleet management system determines in step 1010 that the autonomous vehicle can self-resolve the problem, then the method 1000 continues to step 1015 where the fleet management system instructs the autonomous vehicle to self-resolve the problem. For example, the fleet management system may provide information and/or instructions, which the autonomous vehicle can use to resolve the problem. In step 1020 the autonomous vehicle self-resolves the problem and logs information regarding the issue and/or resolution thereof into a knowledge database for tracking, validation, or other purposes.

If the fleet management system determines in step 1010 that the autonomous vehicle cannot self-resolve the problem, then the method 1000 continues to step 1025, where the fleet management system initiates remote troubleshooting. For example, the troubleshooting subsystem of the fleet management system, in cooperation with the orchestrator of the fleet management system, may initiate provision of the remote troubleshooting to the autonomous vehicle. For example, the orchestrator may assign one or more troubleshooting tasks to the troubleshooting subsystem to initiate the remote troubleshooting.

In step 1030, the troubleshooting subsystem provides the remote troubleshooting and resolves the problem. For example, the remote troubleshooting may include comprehensive evaluation by the troubleshooting subsystem of features and functions of the autonomous vehicle. The remote troubleshooting also may include involvement of other subsystems of the fleet management system, such as a remote operations subsystem through which one or more human operators can monitor and diagnose the autonomous vehicle, e.g., through a teleoperations subsystem or other computing system. Diagnosing the problem may generally include confirming the problem and determining a proper course of action to resolve the issue. The orchestrator can coordinate the assignment and completion of all associated tasks. After the issue is resolved, the troubleshooting subsystem can log information regarding the issue and/or resolution thereof into a knowledge database for tracking, validation, or other purposes.

Figure 11:
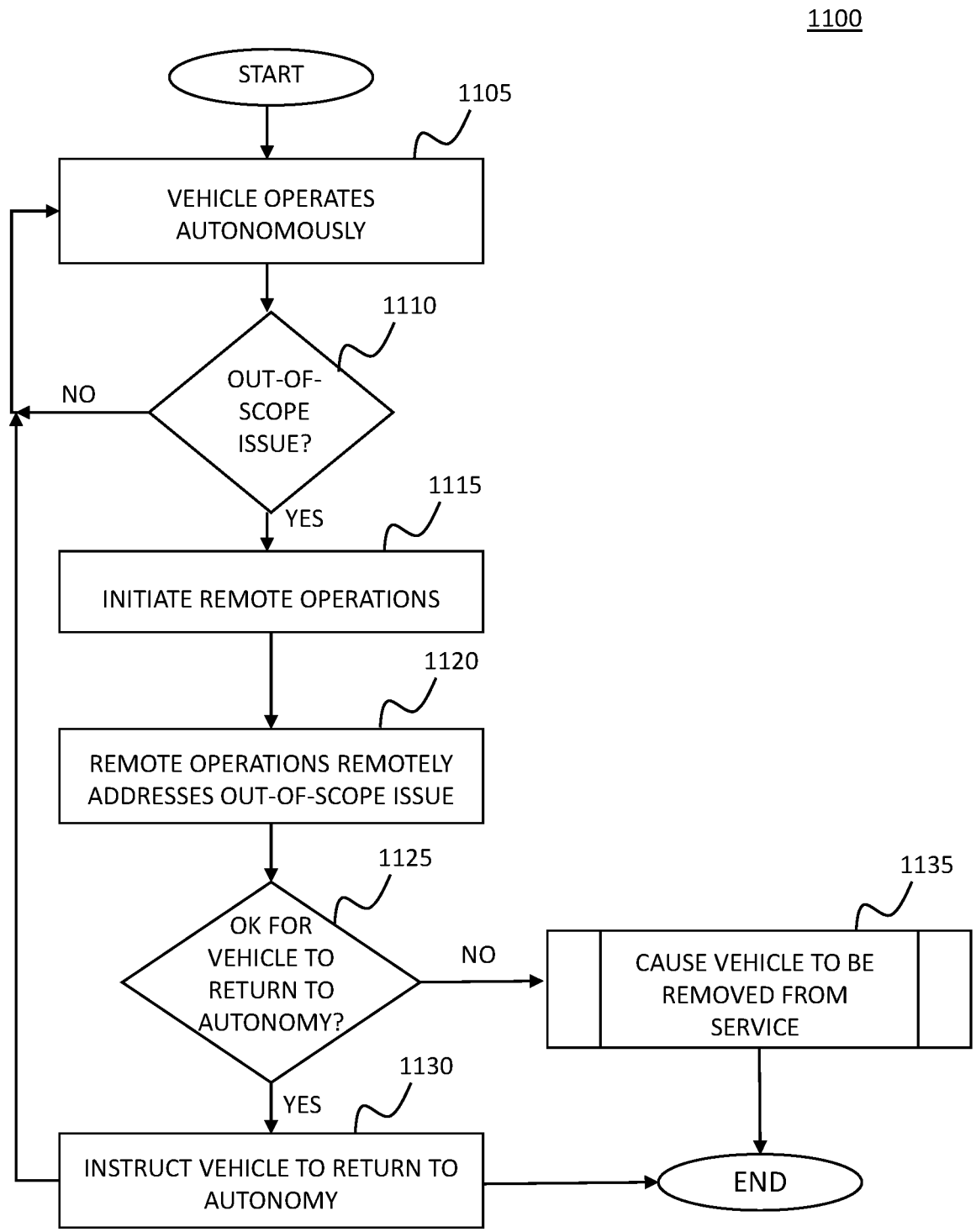
FIG. 11 is a process flow diagram illustrating a method of remotely coordinating remote operations support for an autonomous vehicle, according to an example embodiment.

FIG. 11 is a process flow diagram illustrating a method 1100 of remotely coordinating remote operations support for an autonomous vehicle, according to an example embodiment. In step 1105, the autonomous vehicle operates autonomously. For example, the autonomous vehicle may be sitting idle or driving from a first location to a second location. In step 1110, the fleet management system determines whether the autonomous vehicle is nearing or approaching a situation that is outside the operational design domain of the autonomous vehicle. That is, the fleet management system determines whether there is a situation that the autonomous vehicle is either not comfortable handling or not capable of handling. For example, an autonomous vehicle may not be configured for traveling fully autonomously through a construction zone or traveling around an unexpected object in the path of the autonomous vehicle. Other example conditions outside of the operational design or comfort of an autonomous vehicle will be readily apparent to a person of ordinary skill in the art.

The fleet management system may determine that the autonomous vehicle is nearing or approaching a situation outside the operational design domain of the autonomous vehicle based on a request by the autonomous vehicle for help (e.g., by "raising its hand" in an alert) or based on information observed or detected by the fleet management system. For example, an orchestrator of the fleet management system may monitor the autonomous vehicle, e.g., via one or more other subsystems of the fleet management system, and determine, based on that monitoring that the autonomous vehicle is nearing or approaching a situation outside the operational design domain of the autonomous vehicle.

If the fleet management system determines in step 1110 that the autonomous vehicle is not nearing or approaching a situation outside the operational design domain of the autonomous vehicle, then the method 1100 returns to step 1105, where the autonomous vehicle continues to operate (and the fleet management system continues to monitor the autonomous vehicle while it operates). If the fleet management system determines in step 1110 that the autonomous vehicle is nearing or approaching a situation outside the operational design domain of the autonomous vehicle, then the method 1100 continues to step 1115.

In step 1115, the fleet management system initiates remote operations. For example, a remote operations subsystem of the fleet management system, in cooperation with an orchestrator of the fleet management system, may seize control of the autonomous vehicle in step 1115. The remote operations subsystem may include a teleoperations system or remote-control devices or other mechanisms by which the vehicle can be remotely driven or otherwise controlled. For example, the orchestrator can assign one or more tasks to the remote operations subsystem to initiate the remote operations.

In step 1120, the remote operations subsystem remotely addresses the situation outside the operational design domain of the autonomous vehicle. In an example embodiment, one or more human operators can use the teleoperations subsystem or remote-control mechanism to operate the autonomous vehicle until the situation is handled or otherwise accommodated. For example, the remote operations subsystem may be used to navigate the autonomous vehicle through a construction zone or around another object or road hazard.

While the remote operations subsystem remotely operates the autonomous vehicle, a determination is made in step 1125 whether the autonomous vehicle may resume autonomous operations. For example, the remote operations subsystem, in cooperation with the orchestrator, may determine whether the situation has been handled or accommodated such that it is now safe to resume autonomous operations. If it is determined in step 1125 that the autonomous vehicle may not resume autonomous operations, then the method 1100 continues to step 1135 where the orchestrator cooperates with other subsystems of the fleet management system to remove the autonomous vehicle from service. The vehicle may be removed from service, e.g., because the situation is presumed to be ongoing such that it is not safe or otherwise appropriate for the vehicle to operate autonomously. For example, the orchestrator may assign one or more tasks to the other subsystems to cause the autonomous vehicle to be removed from service. Step 1135 is described in more detail below with reference to FIG. 12.

If it is determined in step 1125 that the autonomous vehicle may resume autonomous operations, then the method 1100 continues to step 1130 where the remote operations subsystem, in cooperation with the orchestrator, instructs the autonomous vehicle to return to autonomous operations. For example, the orchestrator can assign one or more tasks to the remote operations subsystem to cause the autonomous vehicle to be instructed to resume autonomous operations.

Figure 12:
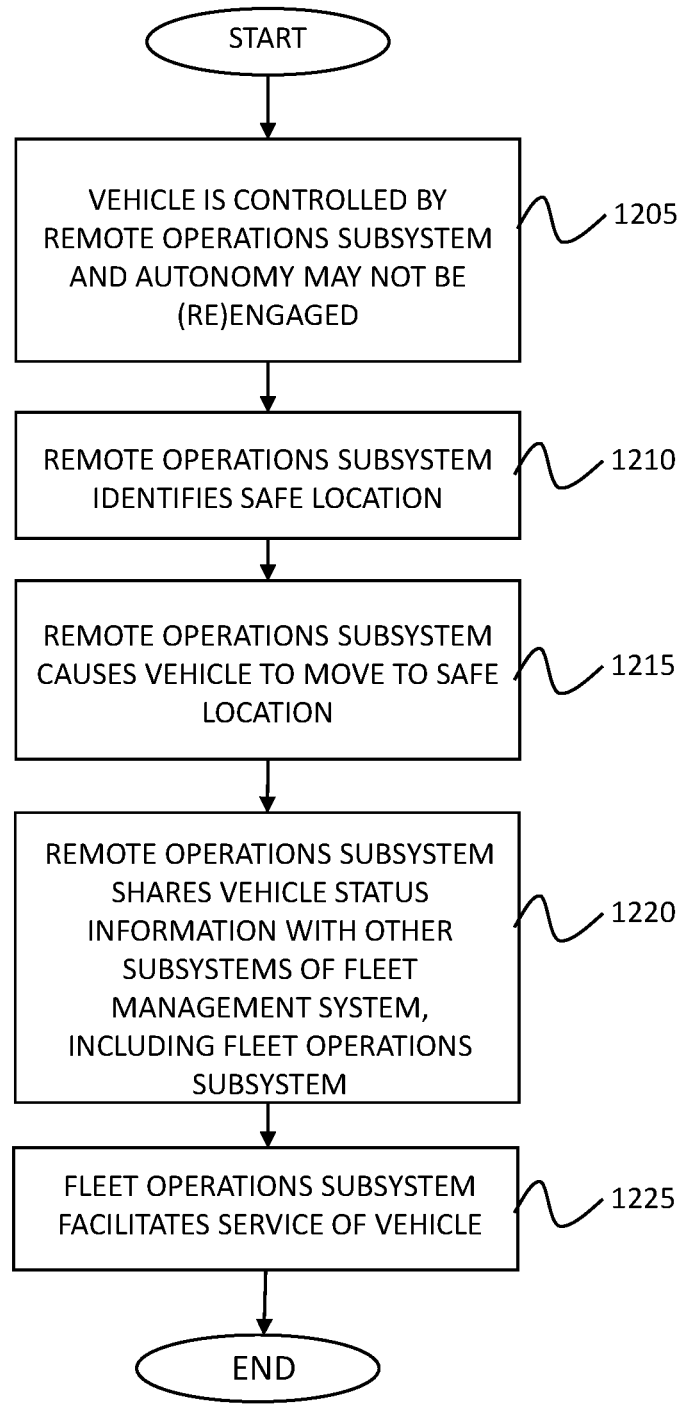
FIG. 12 is a process flow diagram illustrating a method of remotely coordinating service for an autonomous vehicle, according to an example embodiment.

FIG. 12 is a process flow diagram illustrating operations of step 1135 of remotely coordinating service for an autonomous vehicle, according to an example embodiment. For example, the operations depicted in FIG. 12 may continue from step 1130 of the method 1100 described above in connection with FIG. 11. In step 1205, the autonomous vehicle is controlled by a remote operations subsystem and a determination has been made that the autonomous vehicle cannot reengage in autonomous operations. For example, the autonomous vehicle may require technical or operational support prior to reengagement in any autonomous operations.

In step 1210, the remote operations subsystem, e.g., in cooperation with the orchestrator, identifies a safe location. For example, the safe location may be an area nearby the autonomous vehicle where it is safe for the autonomous vehicle to come to a stop. For example, the orchestrator can assign one or more tasks to the remote operations subsystem to cause the remote operations subsystem to identify the safe location. In step 1215, the remote operations subsystem, e.g., in cooperation with the orchestrator, causes the autonomous vehicle to move to the safe location. For example, a teleoperations subsystem, remote control mechanism, or other remote operations mechanism of the remote operations subsystem can cause the autonomous vehicle to pull over and into the safe location. For example, the orchestrator can assign one or more tasks to the remote operations subsystem to cause the remote operations subsystem to move the autonomous vehicle to the safe location.

In step 1220, the remote operations subsystem, in cooperation with the orchestrator, shares status information with other subsystems of the fleet management system, including a fleet operations subsystem. In step 1225, the fleet operations subsystem, in cooperation with the orchestrator, facilitates service of the autonomous vehicle. For example, the fleet operations subsystem can schedule and initiate recovery of the autonomous vehicle. For example, the orchestrator can assign one or more tasks to the fleet operations subsystem to cause the fleet operations subsystem to facilitate the service.

As would be recognized by a person of skill in the art, the steps associated with the methods of the present disclosure, including method 800, method 900, method 1000, method 1100, and method 1135 may vary widely. Steps may be added, removed, altered, combined, and reordered without departing from the spirit or the scope of the present disclosure. Therefore, the example methods are to be considered illustrative and not restrictive, and the examples are not to be limited to the details given herein but may be modified within the scope of the appended claims.

Figure 13:
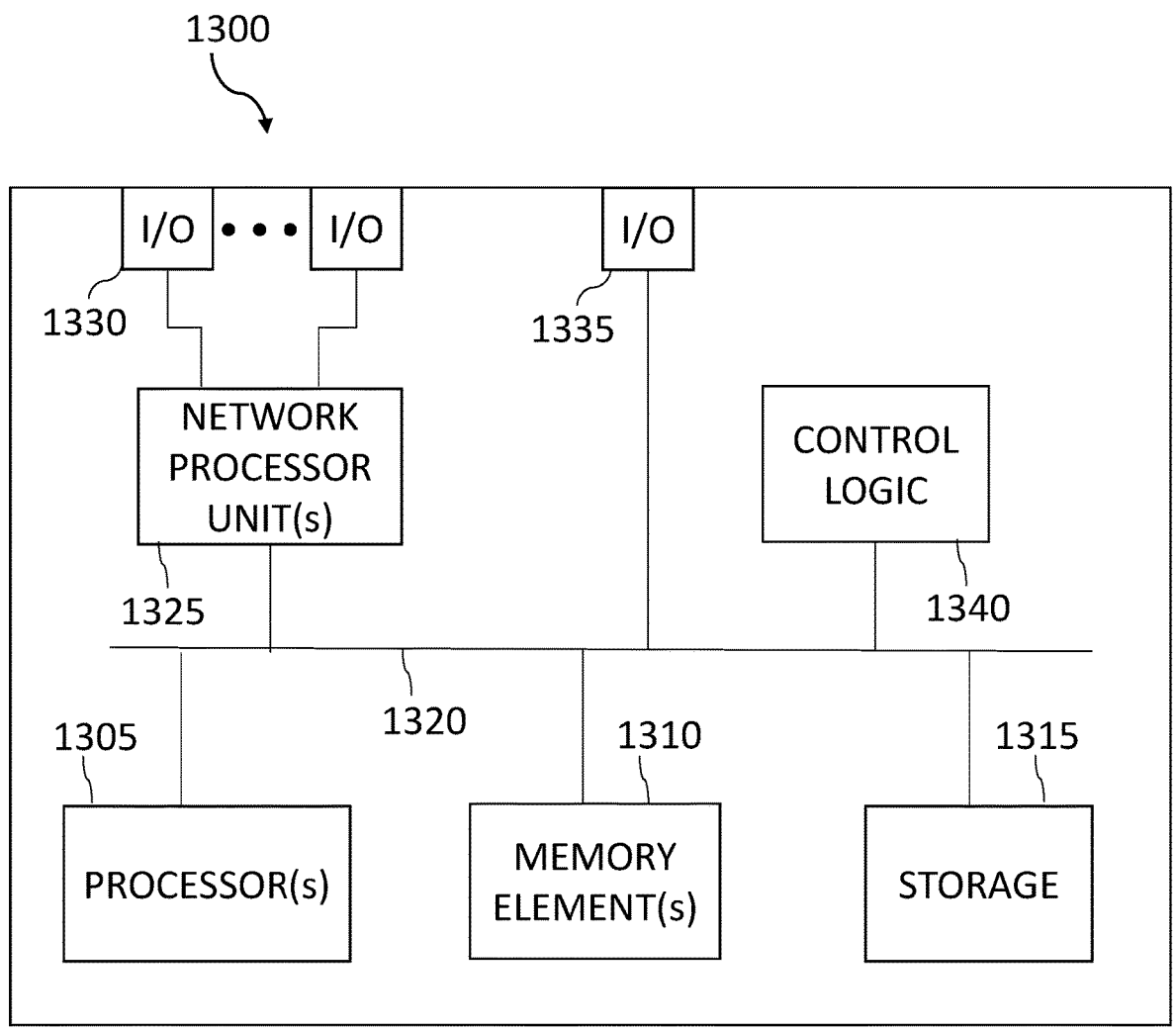
FIG. 13 is a block diagram of a computing device configured to perform the operations of a fleet management system remotely coordinating autonomous vehicle fleet operations, according to an example embodiment.

Referring now to FIG. 13, FIG. 13 illustrates a hardware block diagram of a computing device 1300 that may perform functions associated with operations discussed herein in connection with the techniques depicted in FIGS. 1-12. In various example embodiments, a computing device, such as computing device 1300 or any combination of computing devices 1300, may be configured as any entity/entities as discussed for the techniques depicted in connection with FIGS. 1-12 in order to perform operations of the various techniques discussed herein.

In at least one embodiment, computing device 1300 may include one or more processor(s) 1305, one or more memory element(s) 1310, storage 1315, a bus 1320, one or more network processor unit(s) 1325 interconnected with one or more network input/output (I/O) interface(s) 1330, one or more I/O interface(s) 1335, and control logic 1340. In various embodiments, instructions associated with logic for computing device 1300 can overlap in any manner and are not limited to the specific allocation of instructions and/or operations described herein.

In at least one embodiment, processor(s) 1305 is/are at least one hardware processor configured to execute various tasks, operations and/or functions for computing device 1300 as described herein according to software and/or instructions configured for computing device. Processor(s) 1305 (e.g., a hardware processor) can execute any type of instructions associated with data to achieve the operations detailed herein. In one example, processor(s) 1305 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1310 and/or storage 1315 is/are configured to store data, information, software, and/or instructions associated with computing device 1300, and/or logic configured for memory element(s) 1310 and/or storage 1315. For example, any logic described herein (e.g., control logic 1340) can, in various embodiments, be stored for computing device 1300 using any combination of memory element(s) 1310 and/or storage 1315. Note that in some embodiments, storage 1315 can be consolidated with memory element(s) 1310 (or vice versa), or can overlap/exist in any other suitable manner.

In at least one embodiment, bus 1320 can be configured as an interface that enables one or more elements of computing device 1300 to communicate in order to exchange information and/or data. Bus 1320 can be implemented with any architecture designed for passing control, data and/or information between processors, memory elements/storage, peripheral devices, and/or any other hardware and/or software components that may be configured for computing device 1300. In at least one embodiment, bus 1320 may be implemented as a fast kernel-hosted interconnect, potentially using shared memory between processes (e.g., logic), which can enable efficient communication paths between the processes.

In various embodiments, network processor unit(s) 1325 may enable communication between computing device 1300 and other systems, entities, etc., via network I/O interface(s) 1330 to facilitate operations discussed for various embodiments described herein. In various embodiments, network processor unit(s) 1325 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1330 can be configured as one or more Ethernet port(s), Fibre Channel ports, and/or any other I/O port(s) now known or hereafter developed. Thus, the network processor unit(s) 1325 and/or network I/O interfaces 1330 may include suitable interfaces for receiving, transmitting, and/or otherwise communicating data and/or information in a network environment.

I/O interface(s) 1335 allow for input and output of data and/or information with other entities that may be connected to computer device 1300. For example, I/O interface(s) 1335 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1340 can include instructions that, when executed, cause processor(s) 1305 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1340) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1310 and/or storage 1315 can store data, software, code, instructions (e.g., processor instructions), logic, parameters, combinations thereof, and/or the like used for operations described herein. This includes memory element(s) 1310 and/or storage 1315 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a computer-implemented method can include monitoring, by an orchestrator of a fleet management system, completion of an assigned job by an autonomous vehicle in a fleet of autonomous vehicles. The orchestrator can identify a plurality of tasks to be completed by a plurality of subsystems of the fleet management system in order to enable completion of the assigned job by the autonomous vehicle. The orchestrator can coordinate completion of the plurality of tasks by the plurality of subsystems. For example, the orchestrator can identify the plurality of tasks based on stored information indicating specific tasks to be performed by the plurality of subsystems according to a particular job to be completed by the autonomous vehicle. The orchestrator also can add at least one task to be completed by one of the plurality of subsystems based on the monitoring.

The monitoring can include, for example, monitoring traveling, by the autonomous vehicle, from a first location to a second location. The orchestrator can identify at least one remote operations task to be completed by a remote operations subsystem of the fleet management system to aid the autonomous vehicle in traveling from the first location to the second location. For example, the remote operations subsystem can include a teleoperations subsystem, and the remote operations task can include at least one teleoperations task to be completed by the teleoperations subsystem.

The orchestrator also can detect a problem in connection with the autonomous vehicle, assign at least one troubleshooting task to a remote troubleshooting subsystem of the fleet management system to address the problem, and coordinate completion by the remote operations subsystem of the remote operations task and completion by the remote troubleshooting subsystem of the at least one troubleshooting task. The orchestrator can further identify at least one fleet operations task to be completed by a fleet operations subsystem of the fleet management system and can coordinate completion by the fleet operations subsystem of the at least one fleet operations task. In addition, the orchestrator can identify at least one fleet coordination task to be completed by a fleet coordination subsystem and can coordinate completion by the fleet coordination subsystem of the at least one fleet coordination task.

The orchestrator also can identify a plurality of tasks to be completed by at least two subsystems among a remote operations subsystem of the fleet management system, a remote troubleshooting subsystem of the fleet management system, a fleet operations subsystem of the fleet management system, or a fleet coordination subsystem of the fleet management system. The orchestrator can coordinate completion of the plurality of tasks by the at least two subsystems.

In another form, a computer-implemented method can include monitoring, by an orchestrator of a fleet management system, completion of an assigned job by an autonomous vehicle in a fleet of autonomous vehicles. The orchestrator can read stored information to identify a plurality of tasks to be completed by a plurality of subsystems of the fleet management system in order to enable completion of the assigned job by the autonomous vehicle. The stored information can indicate specific tasks to be performed by the plurality of subsystems according to a particular job to be completed by the autonomous vehicle. The orchestrator can coordinate completion of the tasks by the plurality of subsystems.

In another form, a system can include a job scheduler configured to assign to each of a plurality of autonomous vehicles in a fleet of autonomous vehicles a job, a plurality of subsystems, and an orchestrator. The plurality of subsystems can include: a remote operations subsystem configured to remotely operate the plurality of autonomous vehicles; a troubleshooting subsystem configured to provide technical support services to the plurality of autonomous vehicles; a fleet operations subsystem configured to provide maintenance services to the plurality of autonomous vehicles; and a fleet coordinator subsystem configured to oversee general operations of the plurality of autonomous. For example, the remote operations subsystem can include a teleoperations subsystem.

The orchestrator is configured to identify, for each job, a plurality of tasks to be completed by the plurality of subsystems in order to enable completion of each job by the plurality of autonomous vehicles; and coordinate completion of the plurality of tasks by the plurality of subsystems. For example, the orchestrator can be configured to dynamically adjust job assignments for the plurality of autonomous vehicles based on monitoring of the plurality of autonomous vehicles. The system can further include a database comprising stored information indicating specific tasks to be performed by the plurality of subsystems according to a particular job to be completed by the plurality of autonomous vehicles. In addition, the system can include an interface configured to communicate information regarding each job to a system external to the plurality of subsystems. Variations and Implementations Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
    monitoring, by a fleet management system having at least one processor and being remote from an autonomous vehicle, completion of an assigned job by the autonomous vehicle in a fleet of autonomous vehicles;
    identifying, by the fleet management system, a plurality of tasks to be completed by a plurality of subsystems of the fleet management system to enable the completion of the assigned job by the autonomous vehicle;
    coordinating, by the fleet management system, the completion of the plurality of tasks by the plurality of subsystems, wherein the coordinating includes selecting at least two of the plurality of subsystems of the fleet management system for the completion of the plurality of tasks; and
    causing the at least two of the plurality of subsystems of the fleet management system to control the autonomous vehicle to complete the assigned job based on the coordinating.

2. The computer-implemented method of claim 1, wherein identifying the plurality of tasks is performed based on stored information indicating specific tasks to be performed by the plurality of subsystems according to a particular job to be completed by the autonomous vehicle.

3. The computer-implemented method of claim 1, wherein monitoring the completion of the assigned job comprises monitoring traveling, by the autonomous vehicle, from a first location to a second location, and
    wherein identifying the plurality of tasks comprises identifying at least one remote operations task to be completed by a remote operations subsystem of the fleet management system to aid the autonomous vehicle in traveling from the first location to the second location.

4. The computer-implemented method of claim 3, wherein the remote operations subsystem comprises a teleoperations subsystem, and identifying the at least one remote operations task comprises identifying at least one teleoperations task to be completed by the teleoperations subsystem.

5. The computer-implemented method of claim 3, wherein identifying the plurality of tasks further comprises:
    detecting a problem in connection with the autonomous vehicle; and
    assigning at least one troubleshooting task to a remote troubleshooting subsystem of the fleet management system to address the problem, and
    wherein coordinating the completion of the plurality of tasks comprises coordinating a first completion by the remote operations subsystem of the at least one remote operations task and a second completion by the remote troubleshooting subsystem of the at least one troubleshooting task.

6. The computer-implemented method of claim 5, wherein identifying the plurality of tasks further comprises identifying at least one fleet operations task to be completed by a fleet operations subsystem of the fleet management system, and
    wherein coordinating the completion of the plurality of tasks further comprises coordinating the completion by the fleet operations subsystem of the at least one fleet operations task.

7. The computer-implemented method of claim 6, wherein identifying the plurality of tasks further comprises identifying at least one fleet coordination task to be completed by a fleet coordination subsystem of the fleet management system, and
  wherein coordinating the completion of the plurality of tasks further comprises coordinating the completion by the fleet coordination subsystem of the at least one fleet coordination task.

8. The computer-implemented method of claim 1, wherein the at least two of the plurality of subsystems are selected from among a remote operations subsystem of the fleet management system, a remote troubleshooting subsystem of the fleet management system, a fleet operations subsystem of the fleet management system, or a fleet coordination subsystem of the fleet management system.

9. The computer-implemented method of claim 1, wherein identifying the plurality of tasks comprises:
  adding at least one task to be completed by one of the plurality of subsystems based on the monitoring.

10. The computer-implemented method of claim 1, wherein the plurality of subsystems include a troubleshooting subsystem that troubleshoots at least one mechanical issue detected in the autonomous vehicle, a teleoperations subsystem that remotely drives the autonomous vehicle through one or more unexpected object in a path of the autonomous vehicle, and a fleet operations subsystem that assigns the autonomous vehicle to a maintenance service, and wherein selecting the at least two of the plurality of subsystems includes:
  obtaining information indicating a respective subsystem from among the plurality of subsystems that is responsible for completing a respective next task from the plurality of tasks; and
  assigning the respective next task to the respective subsystem.

11. A computer-implemented method comprising:
  monitoring, by a fleet management system having at least one processor and being remote from an autonomous vehicle, completion of an assigned job by the autonomous vehicle in a fleet of autonomous vehicles;
  reading, by the fleet management system orchestrator, stored information to identify a plurality of tasks to be completed by a plurality of subsystems of the fleet management system to enable the completion of the assigned job by the autonomous vehicle, the stored information indicating specific tasks to be performed by the plurality of subsystems according to a particular job to be completed by the autonomous vehicle;
  coordinating, by the fleet management system, the completion of the plurality of tasks by the plurality of subsystems, wherein the coordinating includes selecting at least two of the plurality of subsystems of the fleet management system for the completion of the plurality of tasks; and
  causing the at least two of the plurality of subsystems of the fleet management system to control the autonomous vehicle to complete the assigned job based on the coordinating.

12. The computer-implemented method of claim 11, wherein monitoring the completion of the assigned job comprises monitoring traveling, by the autonomous vehicle, from a first location to a second location, and
  wherein identifying the plurality of tasks comprises identifying at least one remote operations task to be completed by a remote operations subsystem of the fleet management system to aid the autonomous vehicle in traveling from the first location to the second location.

13. The computer-implemented method of claim 12, wherein the remote operations subsystem comprises a teleoperations subsystem, and identifying the at least one remote operations task comprises identifying at least one teleoperations task to be completed by the teleoperations subsystem.

14. The computer-implemented method of claim 12, wherein identifying the plurality of tasks further comprises:
  detecting a problem in connection with the autonomous vehicle; and
  assigning at least one troubleshooting task to a remote troubleshooting subsystem of the fleet management system to address the problem, and
  wherein coordinating the completion of the plurality of tasks comprises coordinating a first completion by the remote operations subsystem of the at least one remote operations task and a second completion by the remote troubleshooting subsystem of the at least one troubleshooting task.

15. The computer-implemented method of claim 14, wherein identifying the plurality of tasks further comprises identifying at least one fleet operations task to be completed by a fleet operations subsystem of the fleet management system, and
  wherein coordinating the completion of the plurality of tasks further comprises coordinating the completion by the fleet operations subsystem of the at least one fleet operations task.

16. The computer-implemented method of claim 14, wherein identifying the plurality of tasks further comprises identifying at least one fleet coordination task to be completed by a fleet coordination subsystem of the fleet management system, and
  wherein coordinating the completion of the plurality of tasks further comprises coordinating the completion by the fleet coordination subsystem of the at least one fleet coordination task.

17. The computer-implemented method of claim 11, wherein the at least two of the plurality of subsystems are selected from among a remote operations subsystem of the fleet management system, a remote troubleshooting subsystem of the fleet management system, a fleet operations subsystem of the fleet management system, or a fleet coordination subsystem of the fleet management system.

18. The computer-implemented method of claim 11, wherein identifying the plurality of tasks comprises:
  adding at least one task to be completed by one of the plurality of subsystems based on the monitoring.

19. A system comprising:
  at least one memory;
  at least one network interface configured to enable network communications; and
  at least one processor, wherein the at least one processor is configured to perform:
    assigning a job to one or more of a plurality of autonomous vehicles in a fleet of autonomous vehicles;
    identifying, for the job, a plurality of tasks to be completed by a plurality of subsystems to enable completion of the job by a respective autonomous vehicle of the plurality of autonomous vehicles;
    coordinating the completion of the plurality of tasks by the plurality of subsystems by selecting at least two of the plurality of subsystems for the completion of the plurality of tasks; and causing the at least two of the plurality of subsystems to control the respective autonomous vehicle to complete the job, wherein the plurality of subsystems comprise:
- a remote operations subsystem configured to remotely operate the plurality of autonomous vehicles,
- a troubleshooting subsystem configured to provide technical support services to the plurality of autonomous vehicles,
- a fleet operations subsystem configured to provide maintenance services to the plurality of autonomous vehicles, and
- a fleet coordinator subsystem configured to oversee general operations of the plurality of autonomous vehicles.

20. The system of claim 19, further comprising:
a database comprising stored information indicating specific tasks to be performed by the plurality of subsystems according to a particular job to be completed by the plurality of autonomous vehicles.

21. The system of claim 19, wherein the at least one processor is further configured to perform:
dynamically adjusting one or more job assignments for the plurality of autonomous vehicles based on monitoring of the plurality of autonomous vehicles.

22. The system of claim 19, wherein the at least one network interface is configured to communicate information regarding each job to a system external to the plurality of subsystems.

* * * * *